United States Patent [19]

Bernstein et al.

[11] Patent Number: 5,297,249
[45] Date of Patent: Mar. 22, 1994

[54] HYPERMEDIA LINK MARKER ABSTRACT AND SEARCH SERVICES

[75] Inventors: Keith Bernstein, Washington, D.C.; John A. Stephens, Boyds, Md.

[73] Assignee: International Business Machines Corporation, Armonk, N.Y.

[21] Appl. No.: 606,309

[22] Filed: Oct. 31, 1990

[51] Int. Cl.$^5$ .................. G06F 3/14; G06F 15/00
[52] U.S. Cl. ................... 395/156; 395/155; 395/157; 395/161; 395/600; 364/DIG. 1; 364/286; 364/286.1; 364/286.2; 364/286.3; 364/282.1
[58] Field of Search ............... 395/600, 155, 156, 157, 395/159, 161, 144, 145, 146; 364/419

[56] References Cited

U.S. PATENT DOCUMENTS

| | | | |
|---|---|---|---|
| 4,692,757 | 9/1987 | Tsuhara et al. | 340/721 |
| 4,893,256 | 1/1990 | Rutherford et al. | 395/154 |
| 4,914,586 | 4/1990 | Swinehart et al. | 395/600 |
| 4,931,950 | 6/1990 | Ish et al. | 395/11 |
| 4,982,344 | 1/1991 | Jordan | 395/157 |
| 5,204,947 | 4/1993 | Bernstein et al. | 395/157 |

FOREIGN PATENT DOCUMENTS 88119250.4 of 0000 European Pat. Off. .

OTHER PUBLICATIONS

N. Meyrowitz, "Intermedia: The Architecture and Construction of an Object-Oriented Hypermedia System and Applications Framework", OOPSLA 1986 Prooceedings, Portland, Oreg., Sep. 1986.
N. Yankelovich et al., "Intermedia: The Concept and the Construction of a Seamless Information Environment," *Computer*, vol. 21 Iss. 1, pp. 81–96, Jan. 1988.
N. Yankelovich et al., "Connections in Context: The Intermedia System," Proceedings of the Twenty-First Annual Hawaii International Conference on System Sciences, vol. II Software Track, IEEE Computer Society Press, pp. 714–24, Jan. 1988.
Young, Jeffrey S., "Hypermedia," *Macworld*, Mar. 1986, pp. 116–21.
"Hypertext II" by Jakob Nielsen, *SIGCHI Bulletin*, Oct. 1989, vol. 21, No. 2, pp. 41–47.
"Hyperhyper" by Jakob Nielsen, *SIGCHI Bulletin* vol. 21, No. 1, Feb. 1989, pp. 65–67.
"Trip Report: Hypertext '89" by Jakob Nielsen *SIGCHI Bulletin* vol. 21, No. 4, Apr. 1990, pp. 52–61.
"Sun Link Service: Protocol For Open Linking" by Amy Pearl, *Hypertext '89 Proceedings* Nov. 1989, pp. 137–146.
"An Overview of Hypertext & Hypermedia" *Concept & Issues* EP10–010–701, Nov. 1989.
"Multimedia Authoring Systems" *PC Magazine* Jul. 1990, pp. 163–192.
"Desktop Multimedia: You Ain't Seen Nothing Yet" by Eric Bendedr, *PC World* Mar. 1990, pp. 191–196.
"Hypted" by Steve Ditlea, *PC/Computing* Oct. 1990, pp. 201–210.

*Primary Examiner*—Paul V. Kulik
*Attorney, Agent, or Firm*—Whitham & Marhoefer

[57] ABSTRACT

A set of hypermedia linking services enable client applications to incorporate hypermedia capabilities in an open system architecture. The users are provided with a consistent hypermedia interface completely managed by the hypermedia services and not by the client application itself. The graphical user interface includes methods for menu handling, dialog box presentation and pointing device message handling, e.g., mouse message handling. Normal hypermedia activities such as object management, object creation, object deletion and object modification is provided. In addition, an open system searching mechanism is provided to satisfy broad non-context requests for information by the user without sacrificing the advantages of an open hypermedia environment.

14 Claims, 27 Drawing Sheets

MARKER TO OBJECT (UNIDIRECTIONAL)

MARKER TO MARKER (BIDIRECTIONAL)

FIG. 7
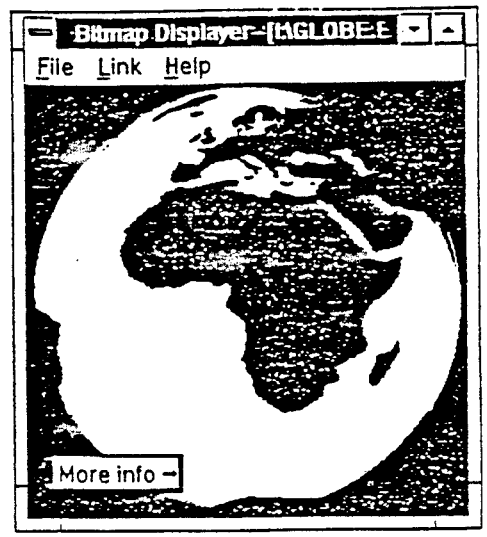
FIG. 8
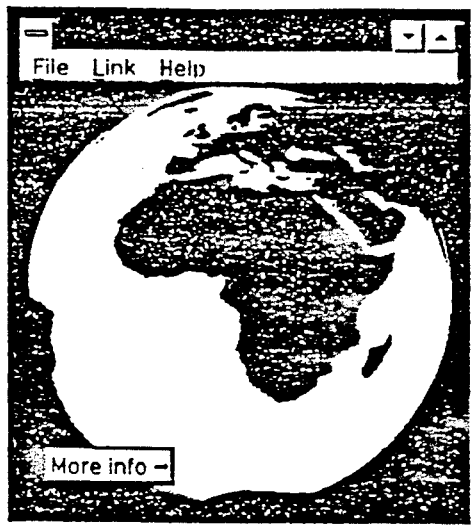
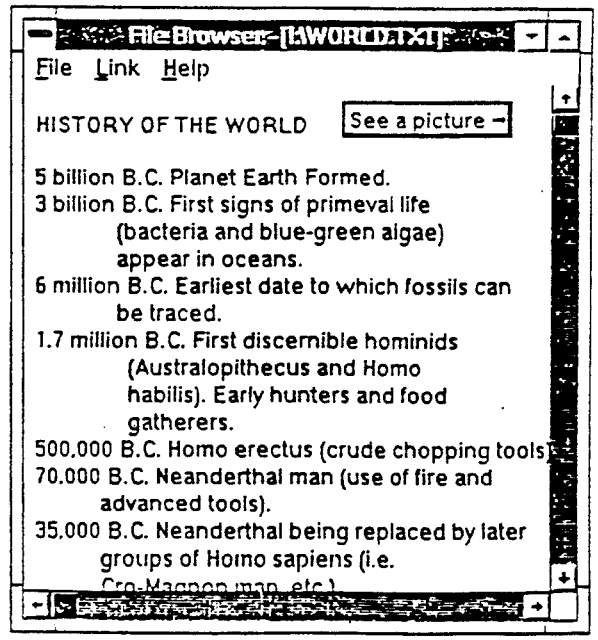

FIG. 9
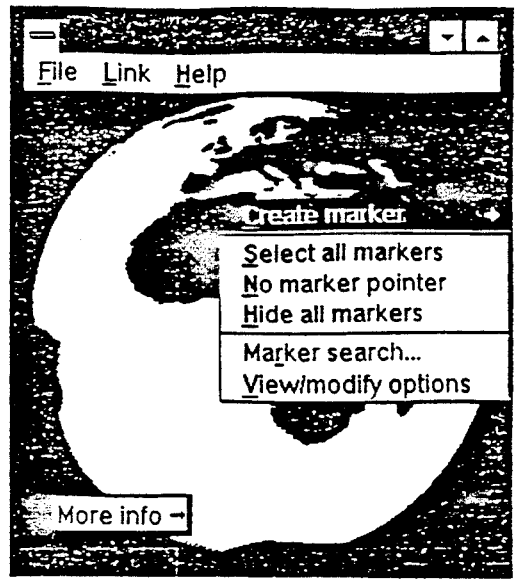
  
FIG. 10
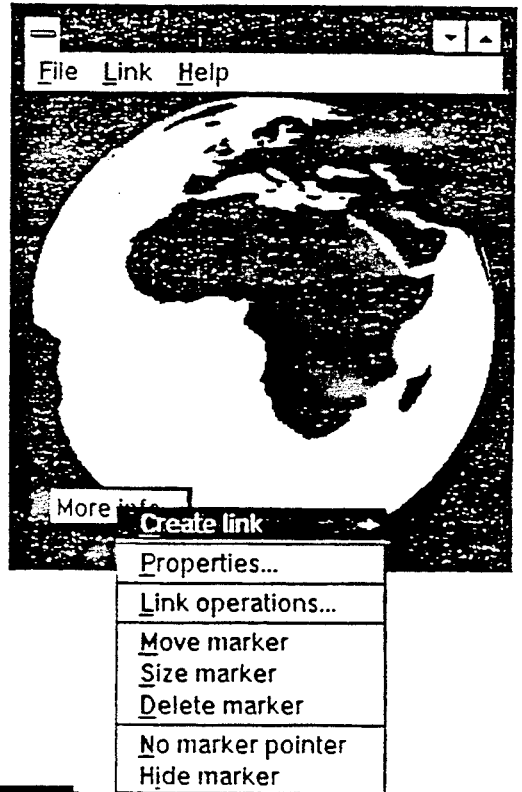
  

HYPERMEDIA LINK MARKER ABSTRACT AND SEARCH SERVICES

CROSS-REFERENCE TO RELATED APPLICATIONS

The invention disclosed in this application is related in subject matter to application Ser. No 07/741,220, filed Aug. 2, 1991, now abandoned, which was a continuation of application Ser. No. 07/273,527 Nov. 18, 1988, by P. Y. Chang et al., now abandoned, and assigned to the assignee of this application. The invention is also related to that of our co-pending patent application Ser. No. 07/606,320, filed concurrently herewith entitled "Application Independent (Open) Hypermedia Enablement Services", now U.S. Pat. No. 5,204,947, also assigned to the assignee of this application. The disclosures of the foregoing applications are incorporated herein by reference.

BACKGROUND OF THE INVENTION

Field of the Invention

The present invention generally relates to a software facility for providing relatively seamless integration of "hypertext/hypermedia" services into existing, as well as new, computer program applications and, more particularly, to support for abstract (i.e., summary and/or keyword) authoring and searching as part of the "hypertext/hypermedia" services.

Definition of Terms

The following terminology is used throughout this disclosure.

Abstract: A text object consisting of keywords, phrases, and/or statements, which summarize the important information that would be found at a link marker with which the text object is associated.

Application: A computer program, other than an operating system, such as a word processor, spreadsheet, database management, graphics designer, and the like. As used herein, an application program is also referred to as a presenter.

Application Programming Interface (API): A means by which a program may call a service.

Client application: An application (presenter/program) which uses LMS services.

Context menu: Often referred to as "popup" menus, context menus are visually and functionally similar to pull-down menus, but are not tied to the action or command bar. They may appear at arbitrary positions in windows. Additionally, while the contents of a pull-down menu typically do not change based on the state of the application at any given time (though they may be enabled or disabled/grayed), the contents of a context menu, on the other hand, are dynamic, and change based on the state of the application; in other words, they are context sensitive. For instance, if a context menu contained an item which said, "Save", when the context menu is displayed and no data has been modified, the "Save" option would not appear in the menu. Context menus are typically displayed when the end user clicks a mouse button over some window. Context menus typically contain similar function to pull-down menus, but only include those items which are relevant to the object clicked on, at a given time.

Document: A named set of data (such as a text file, an image file, a video passage, etc.) usually, but not necessarily, discernible by an end user (when rendered by a presenter). Thus, the term "document" is not limited to a text file but may be text, bitmap graphics, a spreadsheet or some other data presentation. In some cases, other objects are considered as "documents" by LMS. These objects include audio files, motion video files and clips, and a series of image files (i.e., slide shows).

End User Interface (EUI): The methodology, including devices, by which an end user interacts with a system, system component, and/or system application.

Graphical User Interface (GUI): An EUI which is graphical; for example, end user interactions with the system via windows, icons, menus, pointing devices, etc.

Hypertext/Hypermedia: In the generic and simplest sense, these terms mean touch and get. They embody the notion of an end user being able to touch (e.g., using some kind of pointing device) an object (e.g., a word, phrase, graphical object, etc.) and thereby cause one or more associated information entities to be obtained. A survey of hypertext systems is provided in "Hypertext: An Introduction Survey" by Jeff Conklin, *IEEE Computer*, September 1987, pp. 17–41, and "An Overview of Hypertext and Hypermedia", *Concepts & Issues*, McGraw-Hill, November 1989.

Link: An object which associates a point in one document with a point in another document (or different point in the same document). Links may be bidirectional and therefore may be followed from either end.

Link Manager Services (LMS): A complete integrated set of hypertext/hypermedia services.

Link marker: A (typically) visual indication to the end user, contained within a document, indicating that there may be one or more links present at this point (the link marker's location) in the document. If there are links emanating from a link marker and the link marker is triggered (e.g., by the end user with a mouse), the link marker's links may be navigated. LMS provides link markers that can have many different appearance styles, including (1) push-buttons which may optionally contain text, (2) black frames which allow the end user to see through the link marker's framed area to the client application's underlying rendered data, (3) highlight frames which, like black frames, provide for transparency, but which have frames which are guaranteed to be visible (particularly useful compared to black frames when some of the underlying data may be black or very dark), (4) highlight areas which are also transparent in that the patterns of the underlying data will be discernible, but the colors of the underlying data will be changed (also sometimes known as reverse video, e.g., all underlying black color is changed to white, all white color is changed to black, all blue color is changed to yellow, etc.), and (5) invisible which are truly invisible with regard to any occlusion of the underlying data.

Mouse: The term mouse, when used in this document, really refers to any type of operating system supported pointing device including, but not limited to a mouse, track ball, lightpen, touch screen, and the like. Also, the screens, keyboard and mouse operations, menus, etc. with which an end-user interacts with when using an application.

Navigation: The following, or traversal, of a link.

Open system: A hypermedia system which allows any application (presenter) to participate in linking. Such applications need not be aware of documents and/or presenters at the other ends of links, thus allowing for the seamless integration of applications and application-rendered data developed totally independently from one another.

Presenter: An application which renders data (e.g., text files, image files, audio passages, etc.) for an end user.

Pull-down menu: These are the menus which are tied to the action bar (menu bar) at the top of a window. These menus may also contain submenus, which are known as cascade menus.

DESCRIPTION OF THE PRIOR ART

A number of hypertext/hypermedia systems are programmed in an object-oriented programming language, such as Smalltalk and C++. The former was developed at the Xerox Palo Alto Research Center (PARC), and a good description of that language may be had by reference to the textbook by Adele Goldberg and David Robson entitled *Smalltalk-80: The Language and Its Implementation,* Addison-Wesley, 1983. The C++ language was developed by Bjarne Stroustrup of AT&T Bell Laboratories and described, for example, in his book entitled *The C++ Programming Language,* Addison-Wesley, 1986. Among the advantages of Object-Oriented Programming Systems (OOPS) are modular structure and object-oriented user interfaces using icons. Further information on object oriented programming and hypersystems may be obtained from "Design and Use of Hyperdedia Systems" by Robert Akscyn of Knowledge Systems, Inc., *Conference on Human Factors in Computing Systems,* May 14, 1988, and "Intermedia: The Architecture and Construction of An Object Oriented Hypermedia System and Application Framework" by Norman Meyrowitz, IRIS, Brown University, *OOPSLA Proceedings,* September 1986.

Insofar as the inventors are aware, there are no hypertext/hypermedia systems, or system services, which enable applications (presenters) to seamlessly and easily incorporate hypertext/hypermedia capabilities in an open system architecture, as well as automatically provide a consistent end user hypermedia interface which is managed by the hypermedia services, and not the presenter itself. Additionally, even those hypermedia systems which are somewhat "open" systems cannot alter the user interface upon future releases without requiring all hypermedia applications in the system to be modified and rebuilt.

The prior art discussed below are representative of products and/or services which implement hypertext/hypermedia capabilities.

HyperCard published by Apple Corp. is considered by many (including its author, Bill Atkinson) to not be a hypermedia product, but rather an "application builder" or "stack of cards". When viewed as a hypermedia system (in that cards are "linked" together) it is a closed hypermedia system; e.g., one must use only the presentation facilities supplied by the product. HyperCard provides no facility for enabling other (non-HyperCard-supplied) applications (presenters) with hypermedia capabilities.

The SuperCard program by Silicon Beach Software is a HyperCard "look-alike", with more power than HyperCard. It provides stacks of "cards", as well as application generation. Other examples of closed hypermedia systems include Guide 2.0 by OWL International, Inc. which provides no facility for enabling other (non-Guide-supplied) applications (presenters) with hypermedia capabilities; IRIS Intermedia by Institute for Research in Information and Scholarship (IRIS), Brown University, which also provides no facility for enabling other (non-Intermedia-supplied) applications (presenters) with hypermedia capabilities; and LinkWay 2.0 by IBM Educational Systems and which provides no facility for enabling other (non-LinkWay-supplied) applications (presenters) with hypermedia capabilities.

Sun Link Service by Sun Microsystems is the only other open hypermedia system known to the inventors as an available product. Sun's facility does provide a set of services which allow other (non-Sun-supplied) applications to be enabled with hypermedia capabilities; however, this enablement is neither seamless nor easy. Additionally, the Sun Link Service does not manage the end user interface for the hypermedia capabilities, which means that each application must implement its own notion in that regard. Additional information on this product may be found in an article entitled "Sun's Link Service: A Protocol for Open Linking" by Amy Pearl on pages 137–146 of the *Hypertext '89 Proceedings.*

In addition to the foregoing, several other products which implement hypertext/hypermedia capabilities were reviewed in the October 1990 issue of *PC/Computing Magazine* at pages 201–210. These include Folio Views 2.0 by Folio Corp., Hyperties by Cognetics Corp., HyperWriter by Ntergaid, Spinnaker Plus 2.0 by Spinnaker Software Corp., and Transtext by MaxThink. Folio Views was reviewed as: "An information management system that lets you compress 2 large text files into a customized 'infobase' and create cross-referencing links." Nothing further is known of this product, however, the review suggests that this would not allow for linking between different presenters and/or different types of data. This also suggests that no method is provided for enabling other (non-Folio Views-supplied) applications (presenters) with hypermedia capabilities.

Hyperties was reviewed as: "An interactive system that lets you create hypertext documents and manuals from a variety of media, including existing files, online information, scanned material and video." Hyperties is a closed hypermedia system; e.g., one must use only the presentation facilities supplied by the product. Nothing further is known of this product, however, the review suggests that no method is provided for enabling other (non-Hyperties-supplied) applications (presenters) with hypermedia capabilities.

HyperWriter was reviewed as: "A hypertext authoring tool with audio and video capabilities and a limited scripting language."

Spinnaker Plus 2.0 was reviewed as: "A hypertext programming environment for developing and running custom information management applications." Although no more information than this is known, it appears from the review that Spinnaker is more of an application generator program than a "true" hypertext product.

Transtext was reviewed as: "A word processor that lets you create hypertext links to many other commercially available applications." Nothing further is known of this product, however, the review seems to indicate that unidirectional links out of the product may be established, which probably simply cause the launching of existing commercially available applications, simply passing them user-specified parameters.

In addition, KnowledgePro by Knowledge Garden, Inc., was reviewed in the November 1989 issue of *Concepts & Issues,* referenced above, as: ". . . while some skill in programming is useful in becoming familiar with the product, its developers claim such skill is not a prerequisite to learning the program . . . a programming environment that combines an expert system generator with hypertext . . . It can read external files, call external programs, and be extended by routines written in other languages." In addition, the review also suggests that the programming environment/expert system generator combination could yield some sophisticated searching capabilities. However, nothing more specific is known either about the search capabilities or the degree of openness contained in the product.

Although hypermedia systems of any kind are, most fundamentally, information storage and retrieval systems, they all have the distinction of providing for the establishment of the association of information in context, and its subsequent retrieval based on that context. For example, when an end user is reading a hypermedia document about nutrition and comes across, what in LMS terms is called a link marker, indicating that a Table of Nutritional Values will be shown to the reader if the link marker is triggered (e.g., activated via a pointing device) and the reader activates the link marker, then the Table is presented to the reader. If the reader had been using the document in hardcopy form (e.g., a book) then the reader might have had to search for the Table using the index or some other cross-reference section of the document, and perhaps find multiple references for the Table, only one of which was for the actual Table. General purpose information storage and retrieval systems are well suited to the task of just such indexed/cross-referenced searching, but not necessarily in context.

Why not be able to have both? In the November, 1989 issue of *Concepts & Issues* referenced above, in an article discussing hypertext and hypermedia, the observation is made that ". . . adding multimedia capabilities will not solve all the problems associated with using hypermedia for data retrieval. What happens, for example, when users are not quite sure where to look for the information they seek?" (i.e., they can not find a link marker to trigger). What if the end user is viewing hypermedia information which results in an idea for which there are no guiding link markers currently being shown, but the end user wants to pursue information relevant to the idea? And what if the hypermedia system is an open system, such as specified by LMS, having independently developed hypermedia applications with different kinds of data? What open system searching mechanism can be built to satisfy the broad non-context requests for information without sacrificing the advantages of an application and data independent (open) hypermedia environment?

SUMMARY OF THE INVENTION

It is therefore an object of the present invention to provide abstract authoring and searching as part of "hypertext/hypermedia" services, using an open system architecture, for existing, as well as new, applications.

According to the invention, there is provided a set of system link marker abstract services, which enable applications (presenters) to seamlessly and easily incorporate authoring and searching facilities for these serviced objects, consistent with the hypertext/hypermedia capabilities in an open system architecture (as defined by LMS), as well as automatically provide end users with a consistent hypermedia link marker abstract authoring and searching EUI which is completely managed by the underlying services and not the presenter itself.

BRIEF DESCRIPTION OF THE DRAWINGS

The foregoing and other objects, aspects and advantages will be better understood from the following detailed description of a preferred embodiment of the invention with reference to the drawings, in which:

FIG. 7 a screen showing a document and marker before navigation;

FIG. 8 is a screen showing a new document and marker after navigation;

FIG. 9 is a screen showing a context menu when a mouse has been clicked on a document;

FIG. 10 is a screen showing a context menu when a mouse has been clicked on a link marker;

DETAILED DESCRIPTION OF A PREFERRED EMBODIMENT OF THE INVENTION

The invention may be run on a variety of computers under a number of different Operating Systems (OS). The computer could be, for example, a personal computer, a mini computer or a main frame computer. The computer may a standalone system, part of a network such as a Local Area Network (LAN) or Wide Area Network (WAN) or a larger teleprocessing system. For purposes of illustration only, the invention is described below as implemented on a personal computer, such as IBM's PS/2 series, although the specific choice of computer is limited only by memory and disk storage requirements. For additional information on IBM's PS/2 series of computers, the reader is referred to *Technical Reference Manual Personal System/2 (Model 50, 60 Systems)*, IBM Corporation, Part No. 68X2224, Order No. S68X-2224, and *Technical Reference Manual, Personal System/2 (Model 80)*, IBM Corporation, Part No. 68X2256, Order No. S68X-2256.

The operating system on which a preferred embodiment of the invention was implemented was IBM's OS/2 with Presentation Manager (PM), but it will be understood that the invention could be implemented on other and different operating systems and, more importantly, could be integrated into, and therefore be a part of, an operating system. For more information on IBM's OS/2 operating system, the reader is referred to *IBM Operating Systems/2, Version 1.2, Standard Edition Technical Reference*, IBM Corporation.

Figure 1:
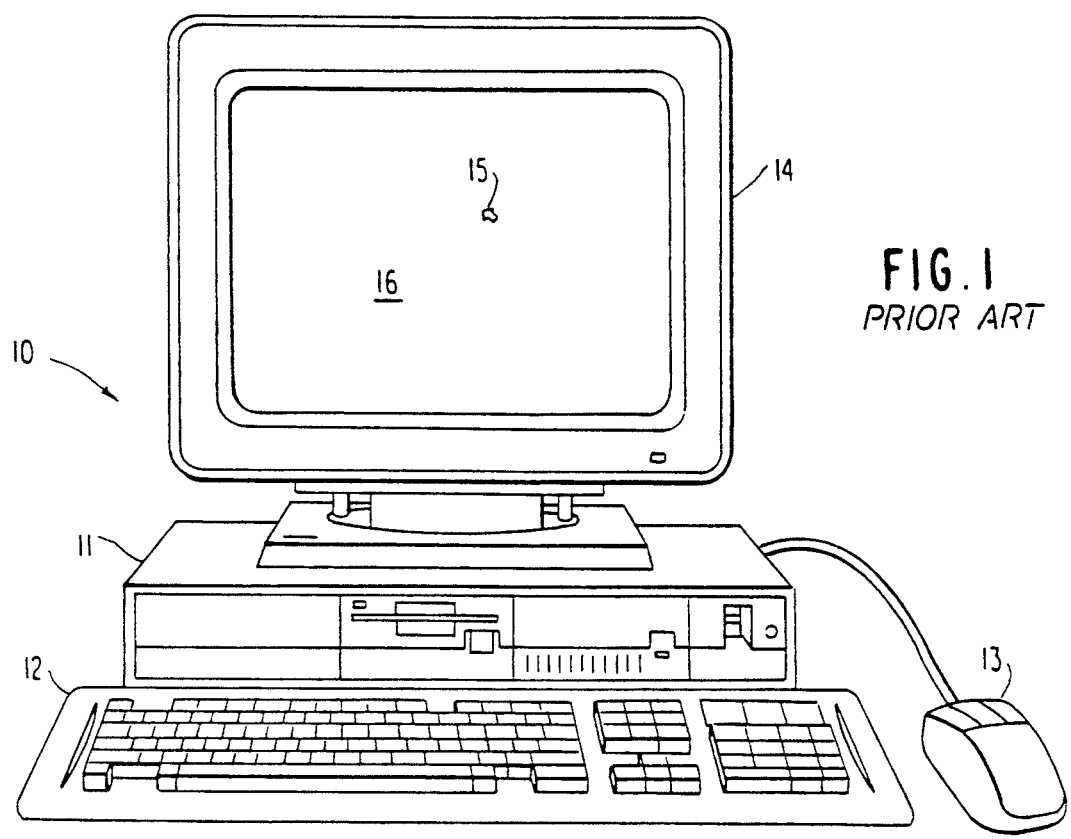
FIG. 1 is pictorial representation of a personal computer.

Referring now to the drawings, and more particularly to FIG. 1, there is shown a personal computer 10 comprising a system unit 11, a keyboard 12, a mouse 13 and a graphics display device or monitor 14. The keyboard 12 and the mouse 13 constitute user input devices, and the display device 14 is a user output device. The mouse 13 is used to control a cursor 15 displayed on the screen 16 of the display device 14. The Graphic User Interface (GUI) supported by this system allows the user to "point-and-shoot" by moving the cursor 15 to an icon or specific location on the screen 16 and then press one of the mouse buttons to perform a user command or selection.

Figure 2:
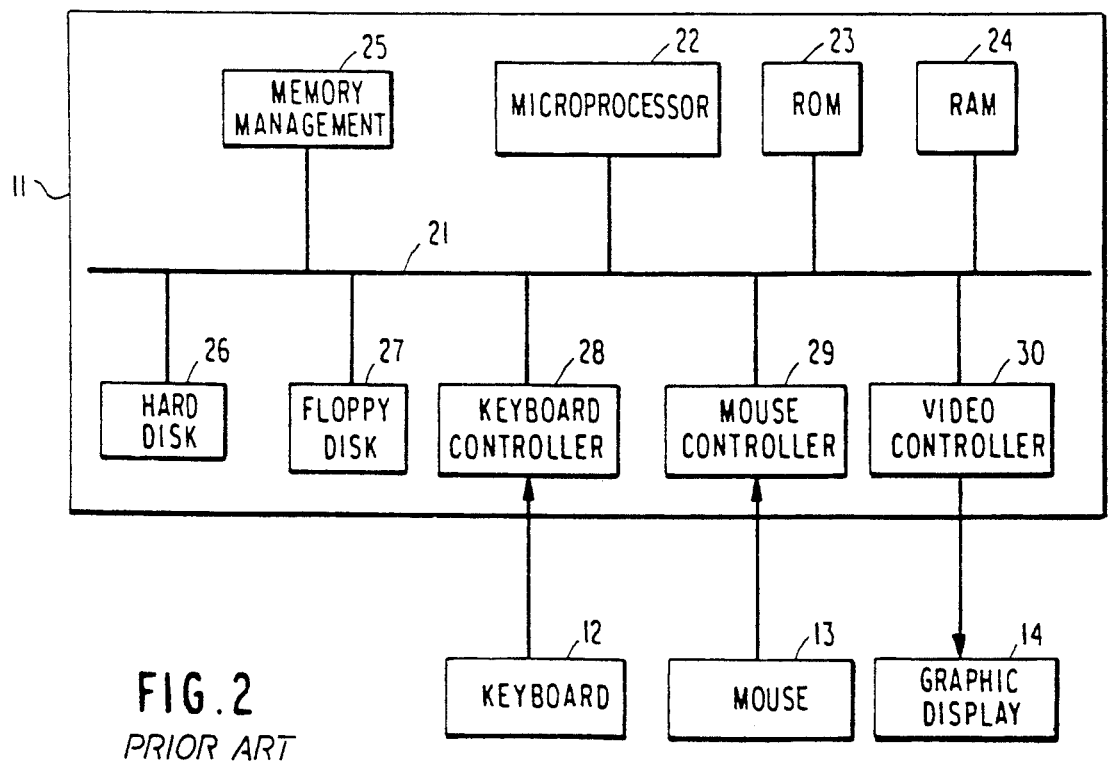
FIG. 2 is a system block diagram of the personal computer shown in FIG. 1.

FIG. 2 shows in block diagram form the components of the personal computer shown in FIG. 1. The system unit 11 includes a system bus 21 to which the various components are attached and by which communication between the various components is accomplished. A microprocessor 22 is connected to the system bus 21 and is supported by Read Only Memory (ROM) 23 and Random Access Memory (RAM) 24, also connected to system bus 21. The microprocessor 22 in the IBM PS/2 series of computers is one of the Intel family of microprocessors including the 80286, 80386 or 80486 microprocessors, but other microprocessors including, but not limited to, Motorola's family of microprocessors such as the 68000, 68020 or 68030 microprocessors and various RISC (Reduced Instruction Set Computer) microprocessors manufactured by IBM, Hewlett Packard, Sun Microsystems, Intel, Motorola and others may be used in a specific computer.

The ROM 23 contains, among other code, the Basic Input/Output System (BIOS) which controls basic hardware operations, such as interactions of the disk drives and the keyboard. The RAM 24 is the main memory into which the operating system and application programs are loaded. A memory management chip 25 is connected to the system bus 21 and controls Direct Memory Access (DMA) operations, including paging data between RAM 24 and a hard disk drive 26 and a floppy disk drive 27.

To complete the description of the system unit 11, there are three I/O controllers. These are the keyboard controller 28, the mouse controller 29 and the video controller 30, all of which are connected to the system bus 21. As their names imply, the keyboard controller 28 provides the hardware interface for the keyboard 12, the mouse controller 29 hardware interface for the mouse 13, and the video controller 30 provides the hardware interface for the graphic display device 14.

The hardware illustrated in FIGS. 1 and 2 is typical but may vary for a specific application; that is, there may be other peripherals, such as optical storage media, audio I/O, printers and the like. The invention is specifically directed to an enhancement to the Operating System (OS) which controls or "runs" the hardware. As mentioned, the invention may be added to an existing OS or it may be integrated into the OS, but it will be assumed for purposes of this disclosure that the OS supports a GUI. Such an operating system is IBM's OS/2 with Presentation Manager (PM) on which the invention has been implemented.

Figure 3:
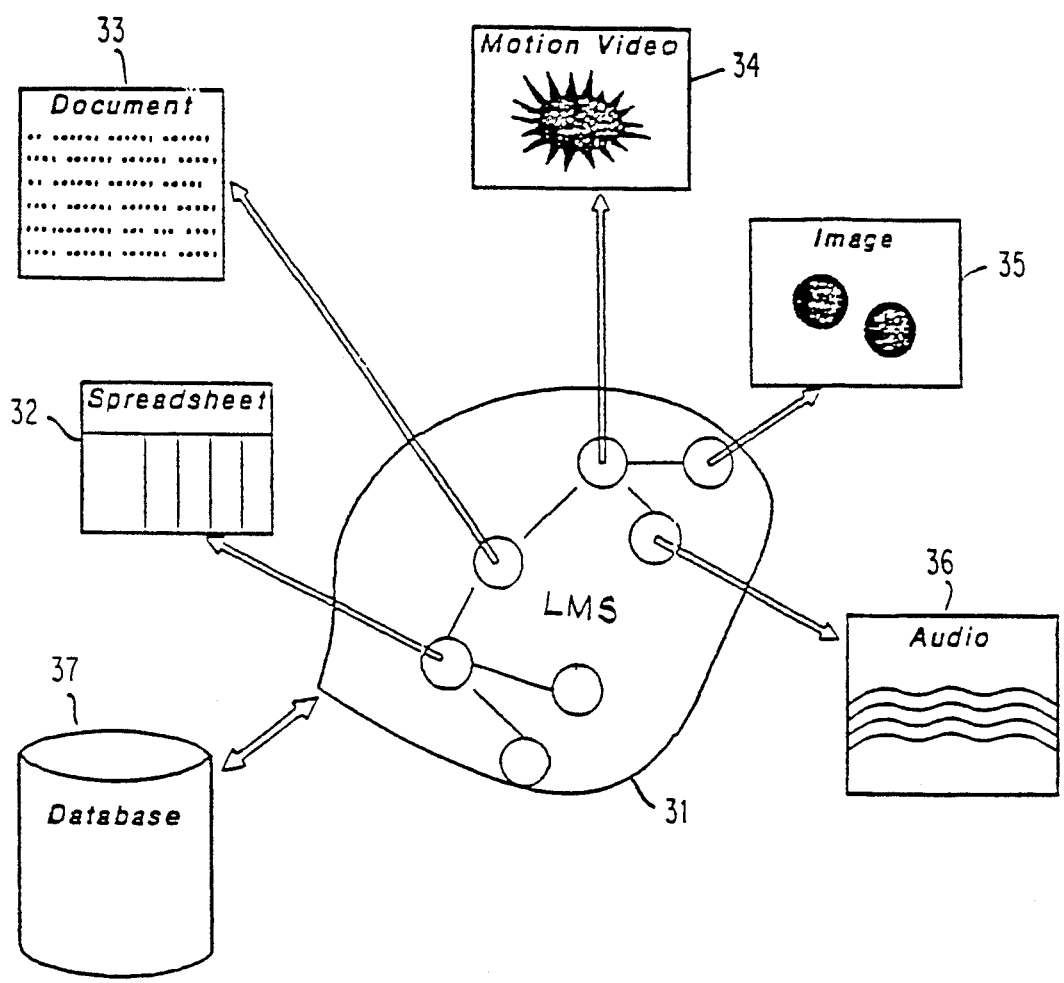
FIG. 3 is a functional block diagram of the link manager services implemented on the personal computer shown in FIGS. 1 and 2.

The invention provides an open system which supports and provides a consistent environment for a variety of unrelated application programs, as generally illustrated in FIG. 3. In FIG. 3, the Link Manager Systems (LMS) 31 is shown by way of example as supporting five application programs including a spreadsheet program 32, a word processing program 33, a motion video program 34, a graphical image program 35, and an audio program 36. As will be described in more detail hereinafter, the LMS 31 maintains via a database 37, stored for example on hard disk drive 26 (FIG. 2), various links specified by the user to each of the several application programs.

The database 37 is a collection of associations that LMS maintains. LMS was specifically and intentionally designed to keep this information separate so as not to require the client applications to have to modify or corrupt their data in order to be an LMS participant. This increases the openness of the LMS system.

Figure 4A:
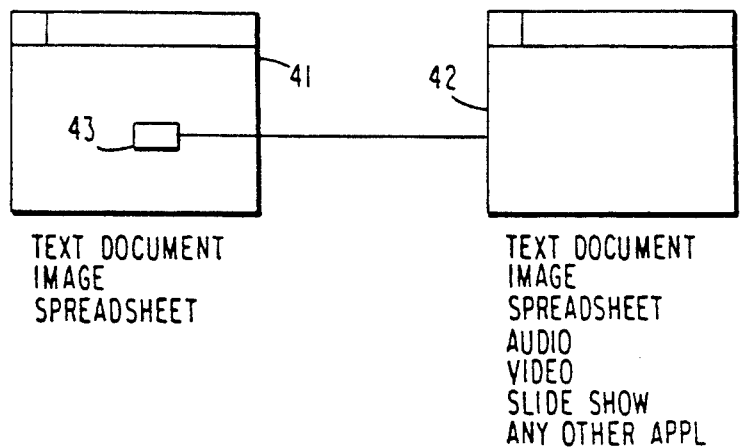
FIG. 4A is a block diagram illustrating a marker to object (unidirectional) link.

There are basically two types of links which may be established. The first, illustrated in FIG. 4A, is a unidirectional link. This is a marker to object link. In FIG.

4A, 41 and 42 represent windows in which various applications may be running. For example, in window 41, there may be displayed a text document generated by a word processing program, an image generated by a graphics program or a spreadsheet. A marker 43 may be located at some point in the displayed document, image or spreadsheet, and this marker 43 can be linked to an object in window 42. The linked object may be in a text document, an image, a spreadsheet, audio, video, slide show or any other application. The link is unidirectional since selecting the marker 43 will cause the linked object to be displayed in window 42, but there is no return to the marker 43.

Figure 4B:
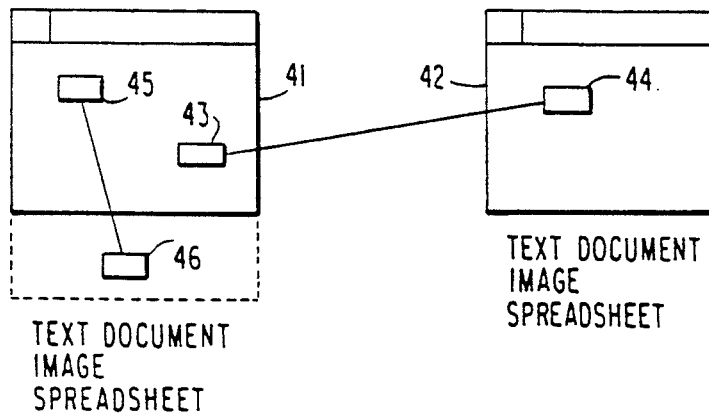
FIG. 4B is a block diagram illustrating a marker to marker (bidirectional) link.

A bidirectional link is illustrated in FIG. 4B. This is a marker to marker link rather than a marker to object link. Thus, for example, a marker 43 in window 41 may be linked to a marker 44 in window 42. Selecting marker 43 will cause marker 44 in a text document, image or spreadsheet in window 42 to be displayed. Note that a marker can link to a marker in the same application. For example, marker 45 in, for example, a text document can be linked to another marker 46. As illustrated in FIG. 4B, the marker 46 may not be simultaneously visible with marker 45, but by selecting marker 45, that portion of the document in which marker 46 is located is displayed. Likewise, when marker 46 is selected, that portion of the document in which marker 45 is located is displayed.

Figure 5:
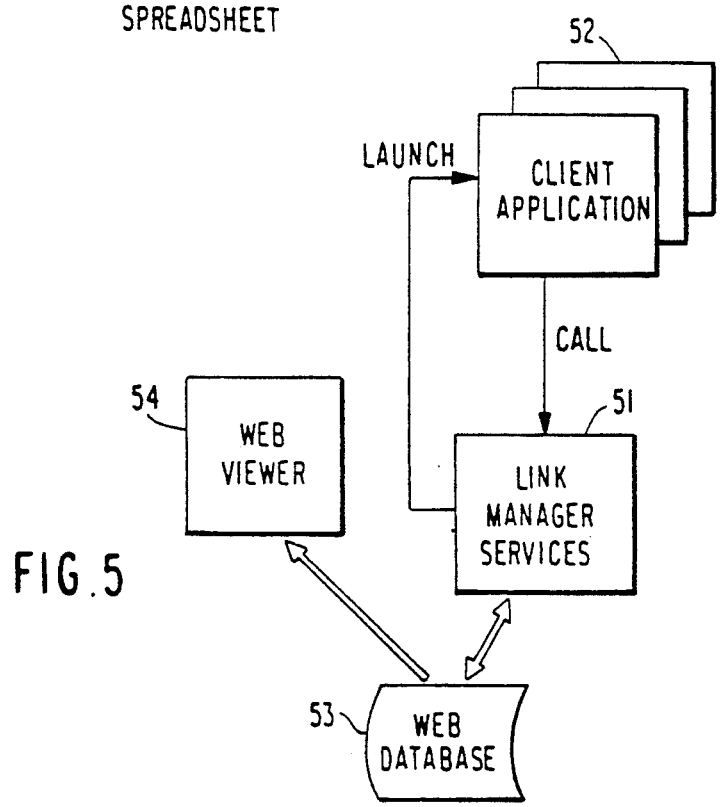
FIG. 5 is a block diagram showing the functional relationship of Link Manager Services in an open system.

FIG. 5 shows in block diagram form the relation of the Link Manager Services (LMS) 51 to various client applications 52. As will be described in more detail hereinafter, the LMS 51 provides a uniform and consistent End User Interface (EUI). In particular, the LMS 51 performs several functions heretofore performed by the individual client applications. These include the generation of menus and dialog boxes which constitute part of the EUI. Thus, a specific client application will issue a call to the LMS 51, and the LMS 51 generates the required menu or dialog box thereby assuring an absolutely uniform and consistent EUI from client application to client application. In addition, the LMS 51 provides the EUI by which various of the client applications 52 may be launched. This will become clear from the following discussion with reference to the various drawing figures, but it should be understood that the LMS 51 is a vehicle for accessing data which may have been generated by any one of the client applications and, when required, will automatically launch a client application in order to access data which has been linked to a marker.

FIG. 5 introduces a new concept and that is the notion of a "web". The term "web" is used to refer to a collection of document, link and link marker definitions. The web represents all the information required by LMS to navigate the defined associations. The navigation can take the end user from a link marker in one document to another application, to a document rendered by a different application, to a margin note (audio, text, etc.), or to another location in the same document. The target application can be one that is participating in the use of LMS or one that is not even aware of LMS. In other words, the use of the web allows LMS to maintain all the necessary data about the associations between documents without modifying the documents themselves.

In one application, a web may be conveniently thought of as a presentation system which utilizes several client applications, such as a word processor, a slide show, an audio show and the like, to provide an end user with multiple choices to access information on a particular topic. Typically, the presentation of the topic is authored by a first type of end user of the system, say an instructor, and is viewed by a second type of end user of the system, say a student. Thus, the presentation of the topic to the student may begin by displaying an initial window on the screen 16 of the display device 14 (see FIG. 1), and the student will typically have one or more link markers from which to select. The presentation then follows an arbitrary order depending on the particular selections of the student.

Using the example given above, when an end user is reading a hypermedia document about nutrition and comes across a link marker, indicating that a Table of Nutritional Values will be shown to the reader if the link marker is triggered (e.g., activated via a pointing device), and the reader activates the link marker, then the Table is presented to the reader. If the reader had been using the document in hardcopy form (e.g., a book) then the reader might have had to search for the Table using the index or some other cross-reference section of the document, and perhaps find multiple references for the Table, only one of which was for the actual Table.

To support this type of presentation, a web database 53 is accessed by the LMS 51 in response to user selections of markers, or the entry of keywords, and presenters (i.e., applications, programs) are launched (started) by LMS 51 to render the required information. The web viewer 54 is used to graphically display the relationships between documents, links and markers within the web database. The web viewer 54 is an LMS supplied client application having two types of capabilities: (a) tools for being able to see what associations exist amongst documents that have been registered with LMS, with varying amounts of scope (e.g., the entire web of applications, or "zoom in" to just a few documents, and (2) tools for web database administration and development. The database 53 is typically stored on the hard disk drive 26 (FIG. 2), and the web viewer 54 produces the output screens to display device 14 (FIG. 1). It should be understood, however, that the web viewer is not the general presentation space and/or device provided by the underlying operating system, devices or LMS. Moreover, its use is not required in order for LMS to be used. The web viewer is a general utility application which is neither necessary for the practice or understanding of the disclosed and claimed invention and, therefore, is not described in more detail.

The specific GUI environment in which the invention is practiced is a windowing environment. The basic messaging set-up is common to most windowed systems, including OS/2 PM, Microsoft ® Windows and X-Windows. Basically, every window in the system has what is called a window procedure associated with it. When the operating system sends a message to a window, that message is routed to the window procedure associated with that window. A window procedure is simply a piece of code provided by the application which owns that window, and which knows how to deal with certain types of messages. The usual messages that are sent from the operating system to a window are user input messages. Messages include things like button presses, window activation, and the like. The window procedure of the window receiving the message can act on the message or not act on the message. If the window procedure does not act on the message, there are certain default procedures that might be called.

In the present invention, LMS makes use of the windowing facility as well. In some places in the flow diagrams, arrows are shown going into the window procedure from both the operating system as user actions from LMS as notification. That means that LMS is also sending notification messages to the application's window procedure.

Figure 6:
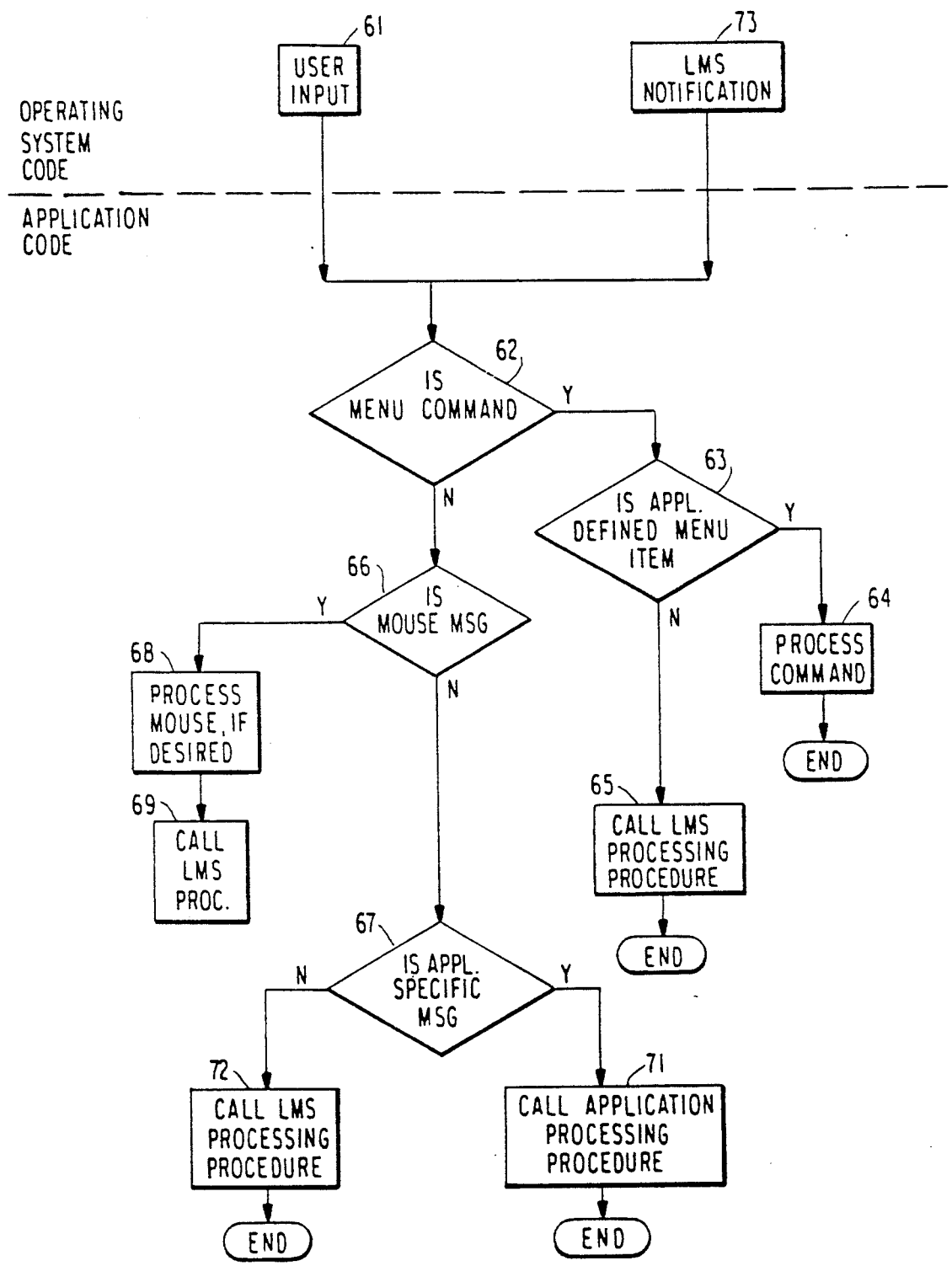
FIG. 6 is a flow diagram showing the logic of the client application window procedure.

Referring now to FIG. 6 of the drawings, there is shown the logic of the client application window procedure according to the invention. This shows a window procedure for a typical LMS enabled application, otherwise known as client application. The user does some input (e.g., presses a mouse button, selects a menu, presses a key or a combination of keys, etc.) at operation block 61, and the operating system sends that message to the client application's window procedure. When the client application's window procedure gets the message, it tests the message in decision block 62 to see if the message is a command message (e.g., a menu command). If so, the application makes a further test in decision block 63 to see if it is one of the menu commands that it has defined; that is, is it one of the menu commands that is pertinent to that application regardless of LMS? These commands include open a new file, cut, paste, and other commands that are particular to applications. If it is one of the menu options that the application itself has defined, then the application will just go ahead and process the command in function block 64 as if LMS did not exist. On the other hand, if the command is not an application defined menu item, but it is a menu command, then the application will call the default LMS processing procedure in function block 65. This service is simply one function call, which is the LMS default processing procedure. Thus, if the application does not understand the menu command, then it will call the LMS service.

Returning to decision block 62, if the command is not a menu command, then a test is made in decision blocks 66 and 67 to see if it is some other type of message specific to the application. For instance, some applications are interested in knowing if a mouse message came in. And if it did, as determined in decision block 66, the application would process it in function block 68 if that was the type of application that processes mouse messages. Some applications do not process these messages, some do not need to, and typically whether an application processes that message or not, the application should call the default LMS procedure in function block 69 so that LMS has a chance to look at that message and to act on it accordingly. For instance, LMS might bring up a context menu.

If command is not a mouse message, then the application determines in decision block 67 whether the message is some other application specific message, and if so, the application calls whatever function it calls to handle that message in function block 71. Otherwise, as with any message that the application does not know how to process, the application will call the LMS default processing procedure in function block 72.

In addition to messages generated by user inputs, LMS sometimes sends its own messages to client applications, as indicated in function block 73, expecting to receive the message itself. Thus, LMS in one window might send a message to another window in the system asking that window if it is aware of LMS, and the application in that other window would not understand the message. The message would not fall into the category of mouse message, menu command message or application specific message, and the application would therefore not process the message and would call the LMS processing procedure. The LMS processing procedure is aware of that message and will go ahead and return TRUE, "yes I am an LMS aware application".

Having described the basic hardware and system configuration, the operation of the LMS will be described by way of example. FIG. 7 shows a computer display screen produced by a Bitmap Displayer program. This program is a presenter (i.e., application) which is rendering the GLOBE.BMP document (a bitmap graphic). The GLOBE.BMP document contains a link marker (whose text says, "More info→") which indicates the existence of associated information. When clicked on with the mouse, the link associated with the link marker will be navigated and the user will be presented with the File Browser presenter rendering the WORLD.TXT document (see FIG. 8). The WORLD.TXT document also contains a link marker (whose text says, "See a picture→") which, if followed, would traverse to the GLOBE.BMP document.

As mentioned, LMS also provides a consistent EUI by assuming the responsibility for generating menus. There are two types of menus; context menus (sometimes referred to as pop-up menus) and pull-down menus. The former are menus that are displayed depending on the context or location of the cursor within the field of the display. FIGS. 9 and 10 show examples of two types of context menus. In FIG. 9, the user has clicked the mouse button over the client application's client or workspace area, near the top of the African continent. This context menu provides the user with several options, including creating a marker at that location. In FIG. 10, the user has clicked on the link marker. The context menu displayed is similar but offers different options (due to the different context), allowing the user to move or delete the marker, among other things.

Client applications need not explicitly instruct LMS to build context menus, and in some cases (e.g., when the mouse is over a link marker as in FIG. 10) need not even forward any messages to LMS. Context menus, then, become almost a "free" feature of LMS, and provide access to the identical functionality of the pull-down menu.

During client application initialization, the client application calls LMS requesting that the hypermedia pull-down menu be built. LMS will then dynamically build the menu so that the menu need not be defined in client application code. All subsequent processing of the menu (e.g., placing check marks next to menu items, disabling menu items, selecting menu items, etc.) is handled by LMS when LMS receives operating system messages which the client application is not interested in processing.

All operating system messages not processed by the client application are forwarded to LMS by the client application using an LMS provided service. This includes menu messages. Based on the particular menu message, LMS decides what needs to be done, and does it. For instance, if the message is that the hypermedia menu is about to be shown, then LMS will adjust the menu's appearance, if necessary, (e.g., disable all inappropriate menu options, etc.) based on the current state of links and link markers, before showing it, or, if the message was that "Create marker" was selected, LMS will create a link marker for the end user without any additional work on the part of the client application. All applications using LMS will have the same hypermedia menus, and the menus will behave in the same fashion, thereby ensuring a consistent EUI.

Figure 11:
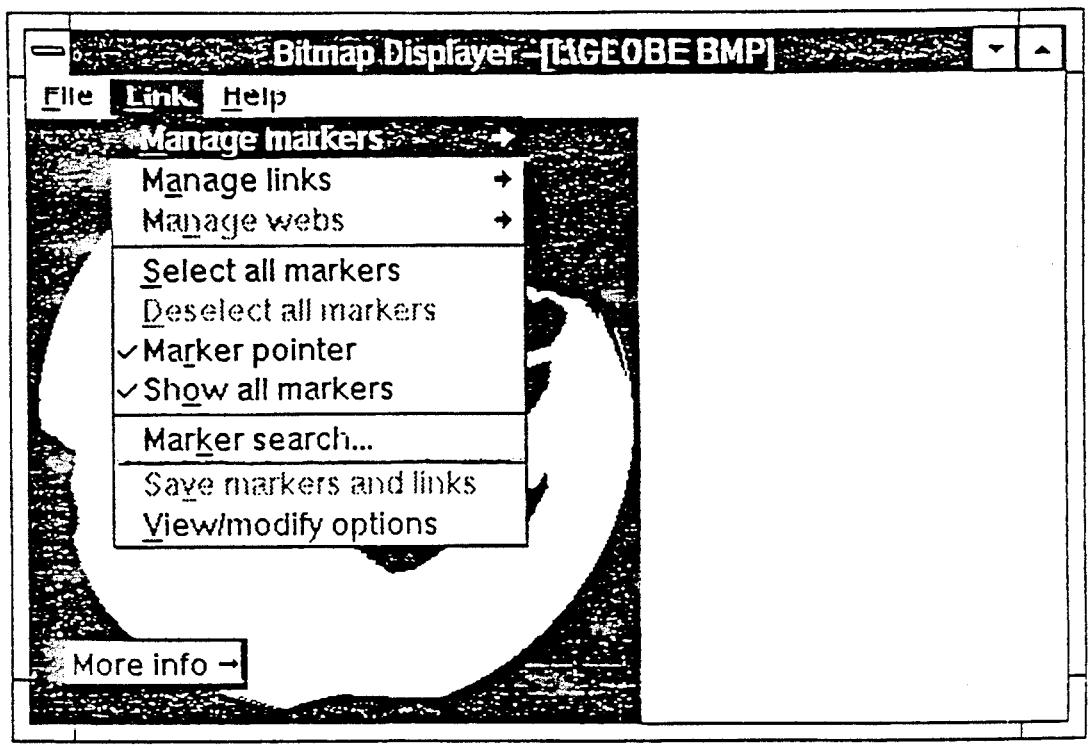
FIG. 11 is a screen showing a pull-down menu when a mouse has been clicked on LINK in the command bar.

Examples are shown in FIGS. 11 to 15. More specifically, FIG. 11 shows a pull-down menu when a mouse has been clicked on LINK in the action or command bar.

Figure 12:
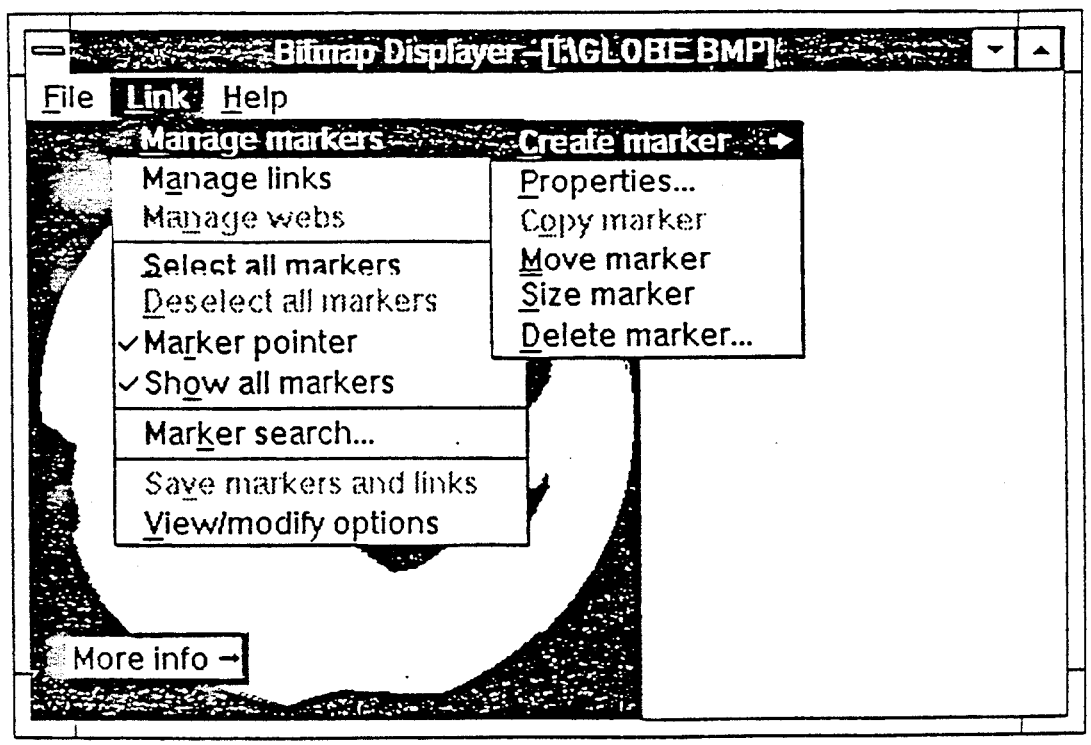
FIG. 12 is a screen showing a second pull-down menu when a mouse has been clicked on MANAGE MARKERS in the first pull-down menu of FIG. 11.
Figure 13:
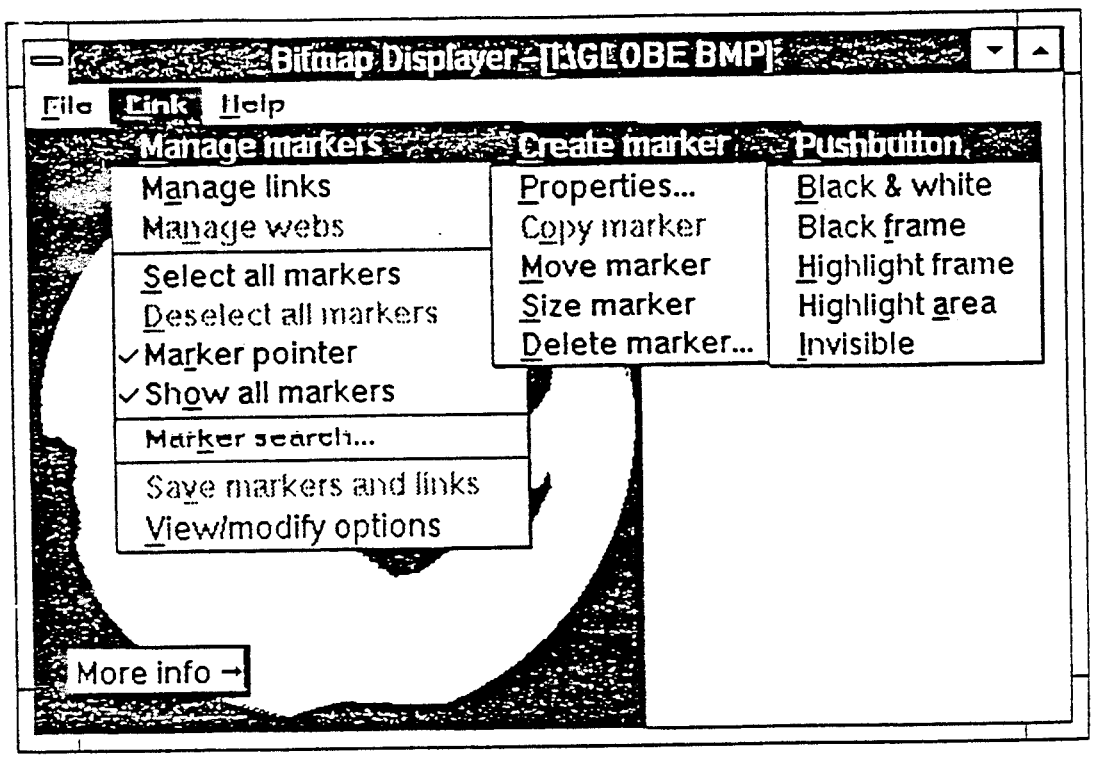
FIG. 13 is a screen showing a third pull-down menu when a mouse has been clicked on CREATE MARKER in the second pull-down menu of FIG. 12.
Figure 14:
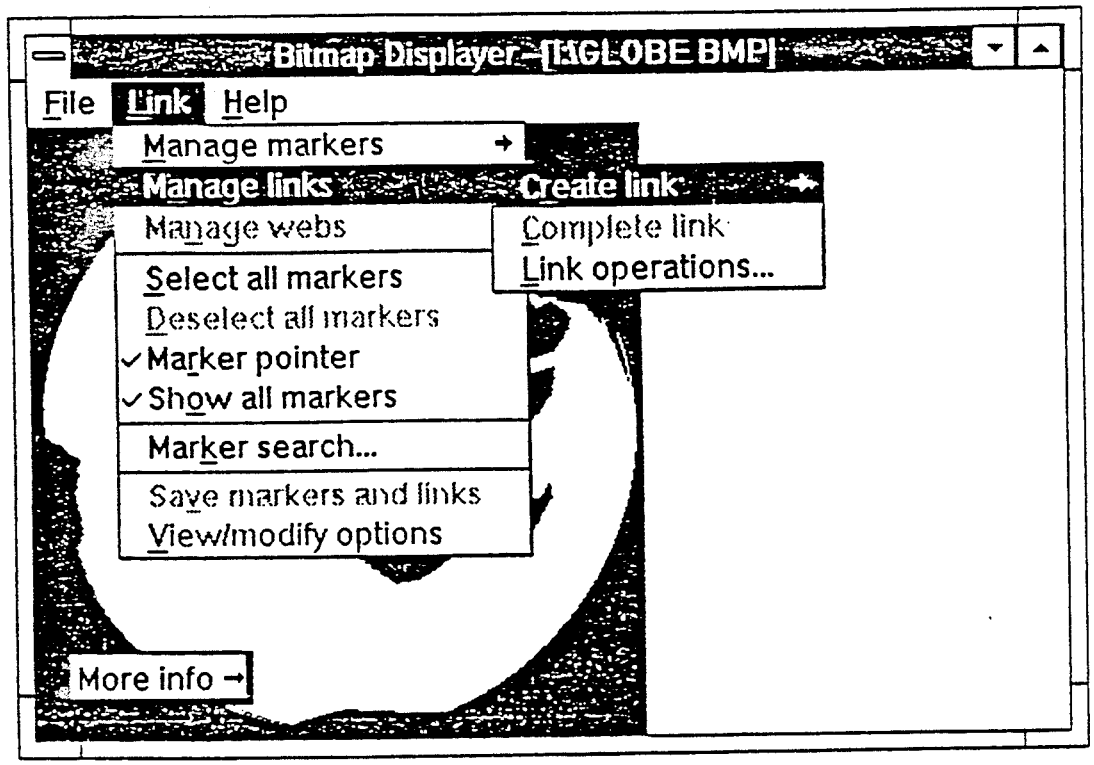
FIG. 14 is a screen showing a second pull-down window when a mouse has been clicked on MANAGE LINKS in the pull-down window of FIG. 11.
Figure 15:
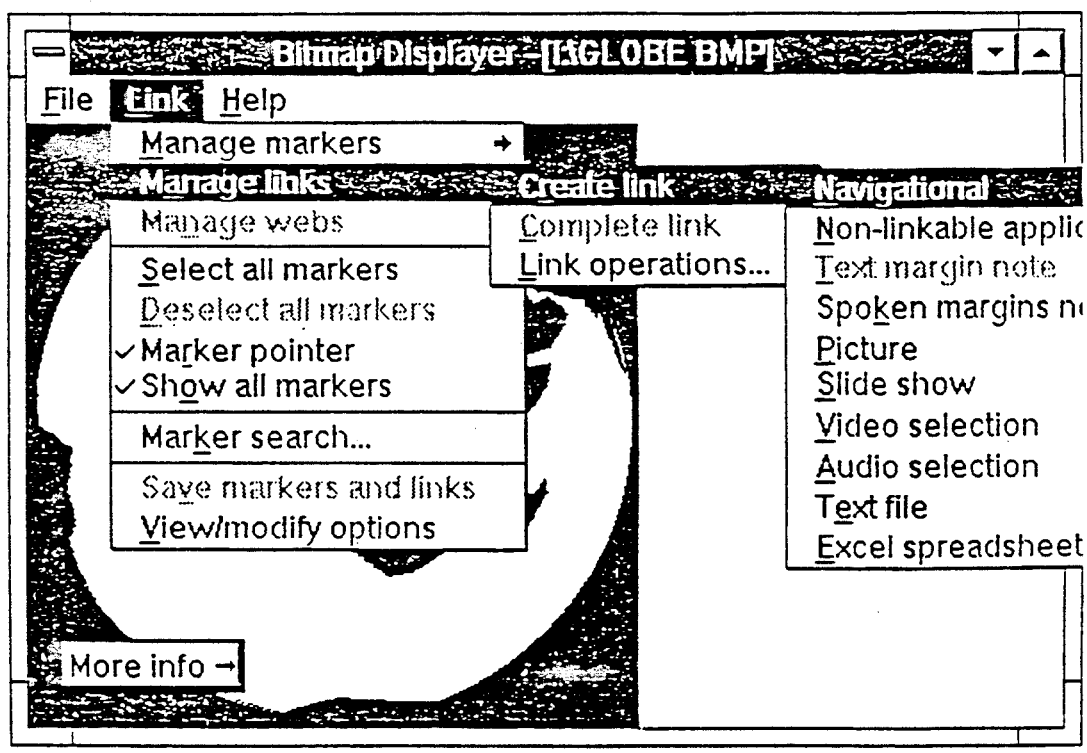
FIG. 15 is a screen showing a third pull-down window when a mouse has been clicked on CREATE LINK in the second pull-down window of FIG. 14.

Pull-down menus may be layered. For example, FIG. 12 shows a second pull-down menu when a mouse has been clicked on MANAGE MARKERS in the first pull-down menu of FIG. 11, and FIG. 13 shows a third pull-down menu when a mouse has been clicked on CREATE MARKER in the second pull-down menu of FIG. 12. A further example is shown in FIG. 14, which shows a second pull-down window when a mouse has been clicked on MANAGE LINKS in the pull-down window of FIG. 11, and FIG. 15, which shows a third pull-down window when a mouse has been clicked on CREATE LINK in the second pull-down window of FIG. 14.

Figure 16:
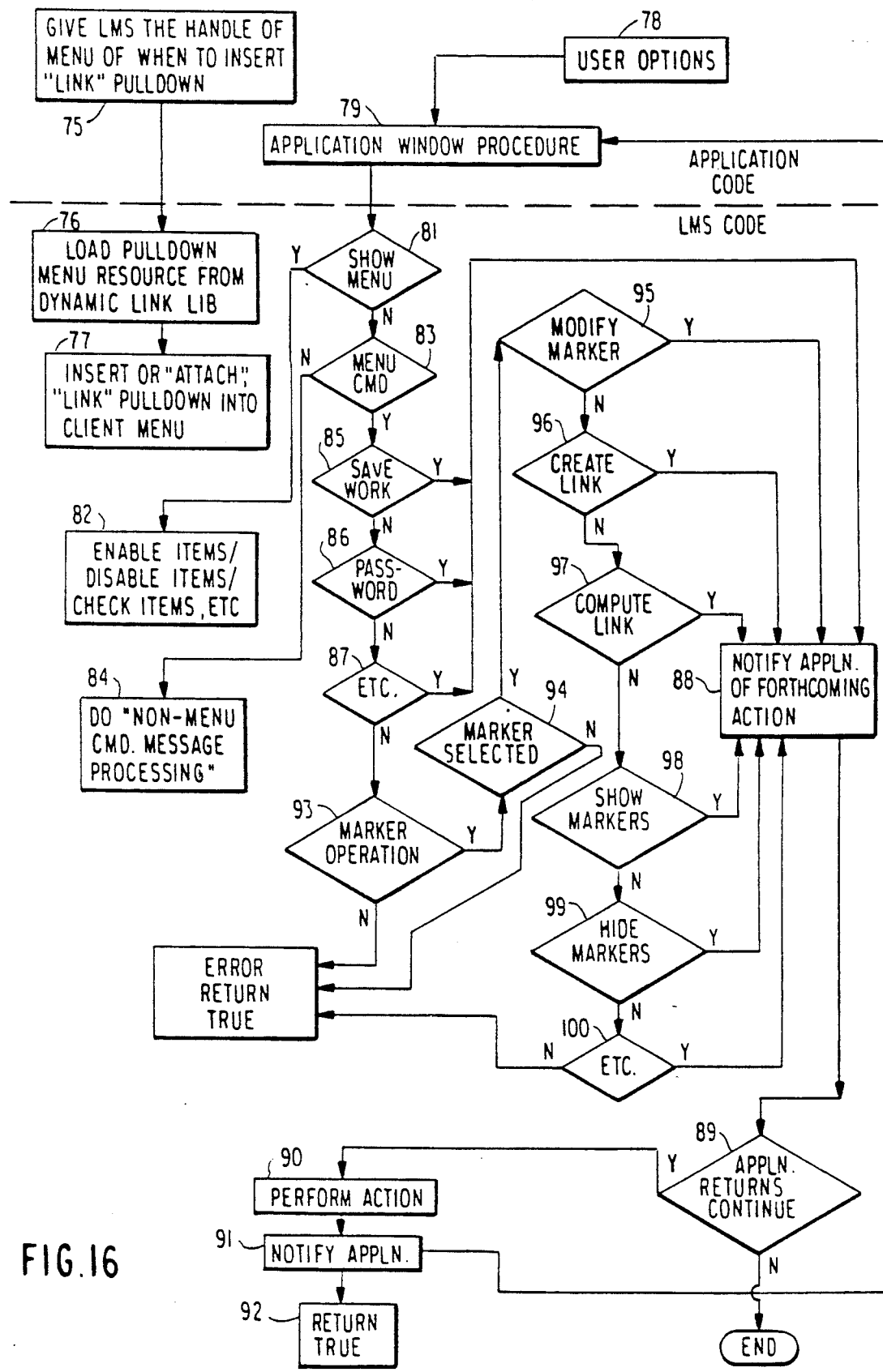
FIG. 16 is a flow diagram showing the logic of the pull-down menu processing performed by LMS.

FIG. 16 is a flow diagram showing the logic of the pull-down menu processing. In order to get all those different menu items that are in that menu, LMS will actually build that menu for the client application, which also means that if in future releases of LMS additional functionality is added, the client application will not have to release a new version to inherit the additional LMS features, since LMS builds that menu. The way LMS builds the menu is that when the application first starts up, it calls LMS, through an LMS API function call, and passes LMS a handle to its top level menu, usually the action bar, as indicated at function block 75. LMS then loads its pull-down menu definition which has been saved as a resource as part of its dynamic link library in function block 76. When LMS loads the resource, it will insert it, or attach it, into the client window's menu handle in function block 77. From then on, when that menu option is selected by the end user, they will see all the LMS menu items in that menu. This procedure occurs at initialization time.

The rest of the flow diagram of FIG. 16 illustrates how the actual pull-down menus are processed. Keep in mind that in LMS there are two types of menus. The pull-down menus are the menus that are displayed when the user selects the link from the action bar, while context menus are displayed in response to mouse clicks on the client window. Context menus are afforded similar options, but they are more specific to the object that the user has clicked on. Thus, what happens in the processing for these two types of menus is different.

When a user action comes in, as indicated at function block 78, it goes to the application's window procedure, represented by function block 79. At that point, the application window procedure may determine that this is not a menu command that it knows (i.e., defined in the application code), so it passes the message to the LMS processing procedure (see FIG. 6). LMS determines in decision block 81 whether the message requires a menu to be shown. If so, in function block 82 LMS might enable some menu items that are applicable, disable ones that are not applicable, and/or check some items. Otherwise, a test is made in decision block 83 to determine if the message is a menu command message. If not, the "Non-Menu Command Message Processor" is called in function block 84. This procedure is described in more detail hereinbelow with reference to FIG. 18. If the message is a menu command, then LMS will go ahead and try to perform the appropriate action. For instance, there are certain messages such as save markers and links, password, and the like, that LMS will process. If the message is one that LMS will process as determined in decision blocks 85, 86 and 87, LMS notifies the client application of the forthcoming action in function block 88 and then, if the application does not object to LMS performing the command as determined in decision block 89, LMS performs the function in function block 90, notifies the application in function block 91, and returns a "TRUE" message in function block 92. Thus, if the message is one of those commands that LMS will process, LMS will perform the command, as discussed in more detail hereinafter. Then LMS notifies the application after it performs a command, and usually it supplies the application at that point also with a handle to the object that it just acted on so that the application can do some post-processing.

If the message is a marker operation as determined in decision block 93, a further test is made in decision block 94 to determine if the marker is in a selected state. The marker must be in a selected state before a user can modify it from the command pull-down menu (although this is not true of context menus). Typically, those items which only act on objects which are not in a selected state are grayed out. For example, if there are no selected markers, then move marker would be grayed out, and the user would not be allowed to select it. If there are no markers selected, then modify marker would be disabled and the user would not be able to select that command. This is different from context menus in that context menus simply omit items that are not applicable. In any case, LMS does provide code to double check to make sure it is okay to do some work. Therefore, if the menu command operates on a marker, it will first determine whether or not there is at least one marker selected in a selected state and, if so, go ahead and do the appropriate marker command; that is, modify marker, create link, complete link, show markers, hide markers, etc. as determined by decision blocks 95, 96, 97, 98, 99, and 100. Create link and complete link are considered marker operations because they create a link emanating from a marker or complete a link to a marker. Once those commands are completed, the application is notified that LMS performed a command and return true.

Figure 17:
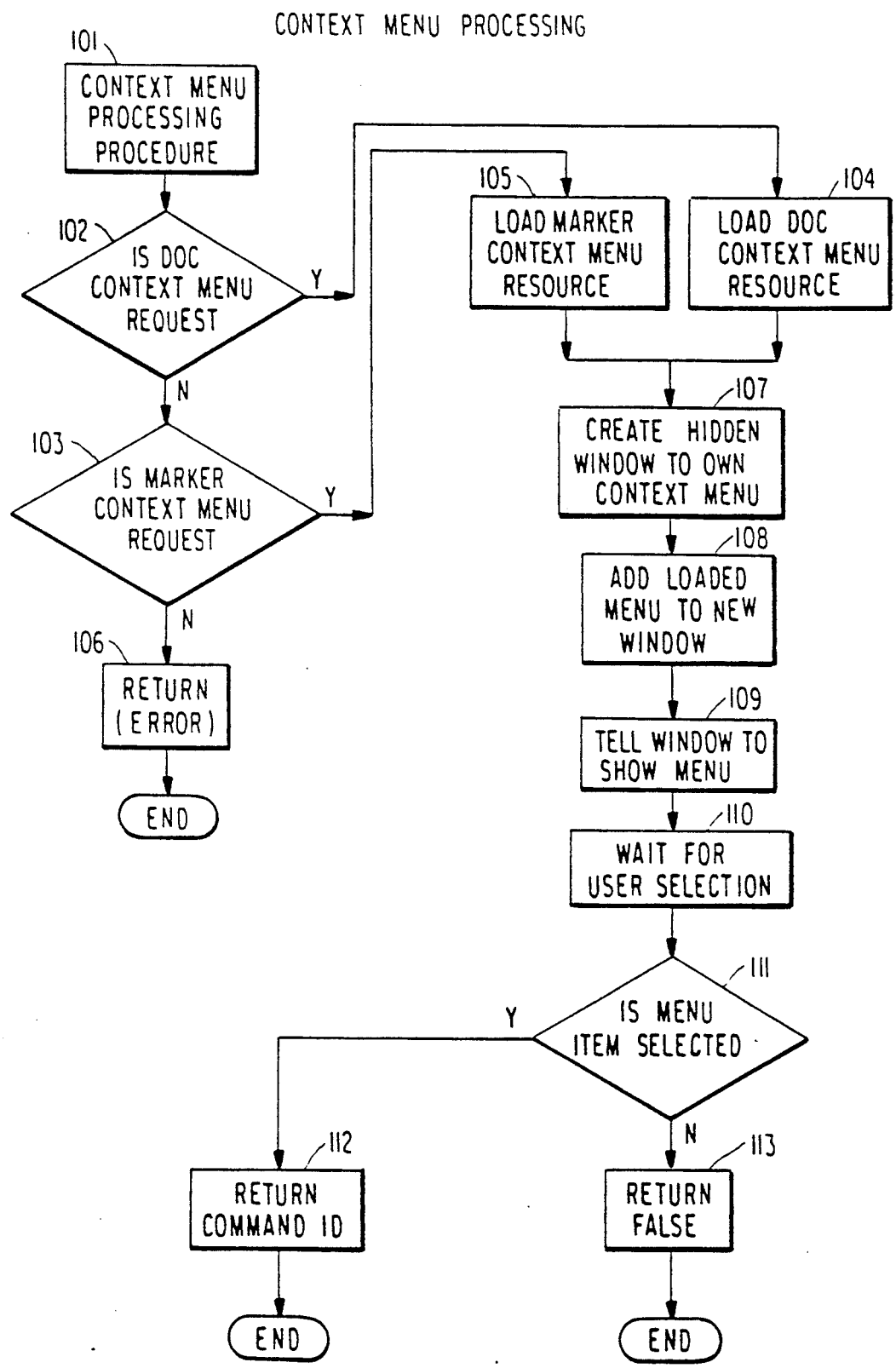
FIG. 17 is a flow diagram showing the logic of the context menu processing performed by LMS.

Turning now to FIG. 17, there is shown a flow diagram which illustrates the logic of the context menu processing procedure 101. The process begins by first determining in decision blocks 102 and 103 what type of context menu LMS is supposed to display. The test in decision block 102 determines whether a doc. context menu is to be displayed, and the test in decision block 103 determines whether a marker context menu is to be displayed. If LMS is supposed to display a doc. context menu, the resource definition of that menu is loaded in function block 104, and if LMS is supposed to display a marker context menu, the resource for the marker menu is loaded in function block 105. If neither a doc. context menu nor a marker context menu, an error message is returned in function block 106.

Once LMS has loaded the menu, a hidden window is created in function block 107 which is actually going to own the menu that was just loaded. Then, in function block 108, the loaded menu is added to the new window and, in function block 109, the window is told to show the menu. It should be understood that items in the menu will be removed, based on the state of the object, similar to when items are enabled and disabled from the link pull-down menu. At this point, LMS waits for a user selection in function block 110. In decision block 111, a determination is made as to whether or not the user actually canceled the menu or selected an item from the menu. If a menu item was actually selected, the command ID is returned, as indicated in function block 112. Otherwise, a false is returned in function block 113.

Now that the cases when LMS gets a user command because menus have been selected have been discussed, what about other non-menu command processing? A generally available feature of most windowing systems is that of messages. Messages may be sent to an application from the operating system, another application, itself, or services operating on behalf of the application. These messages are notifications to the application of requests, responses to requests, actions performed, etc.

Similarly, LMS uses this mechanism to allow client applications to optionally be aware of, qualify, limit, modify, or prevent actions that LMS is about to take. Additionally, LMS informs client applications via messages after some actions have been taken. Both the "before" as well as the "after" messages are sent regardless of whether the actions represented by the messages were initiated by the end user using the EUI, or by another client application, or by the client application itself. Generally, the client application is free to ignore (pass through for default processing) these messages and will obtain the default (LMS) processing for them. But the opportunity to do otherwise is available.

For example, when LMS has been requested to show a pull-down or context menu, LMS sends the client application a message notifying it of same before any action is taken regarding the menu. The client application might want to disable/remove some item from the LMS menu before the menu is actually displayed. Similarly, when an LMS menu item is requested (e.g., to create a link marker), or the end user "clicks" on a link marker thereby requesting that LMS navigate/follow to the other end of one or more of the link marker's "other ends", then a message is sent to that client application advising it of same.

LMS provides a rich API by which client applications may optionally exert control over the behavior and data of the LMS hypermedia system. In fact, in terms of functionality and capability, the LMS API is a significant superset of the LMS EUI, thus providing client applications with powerful capabilities and possibilities. More typically however, in order for a client application to be a significant participant as a hypermedia participant, it only needs to make minimal use of the LMS API.

Figure 18:
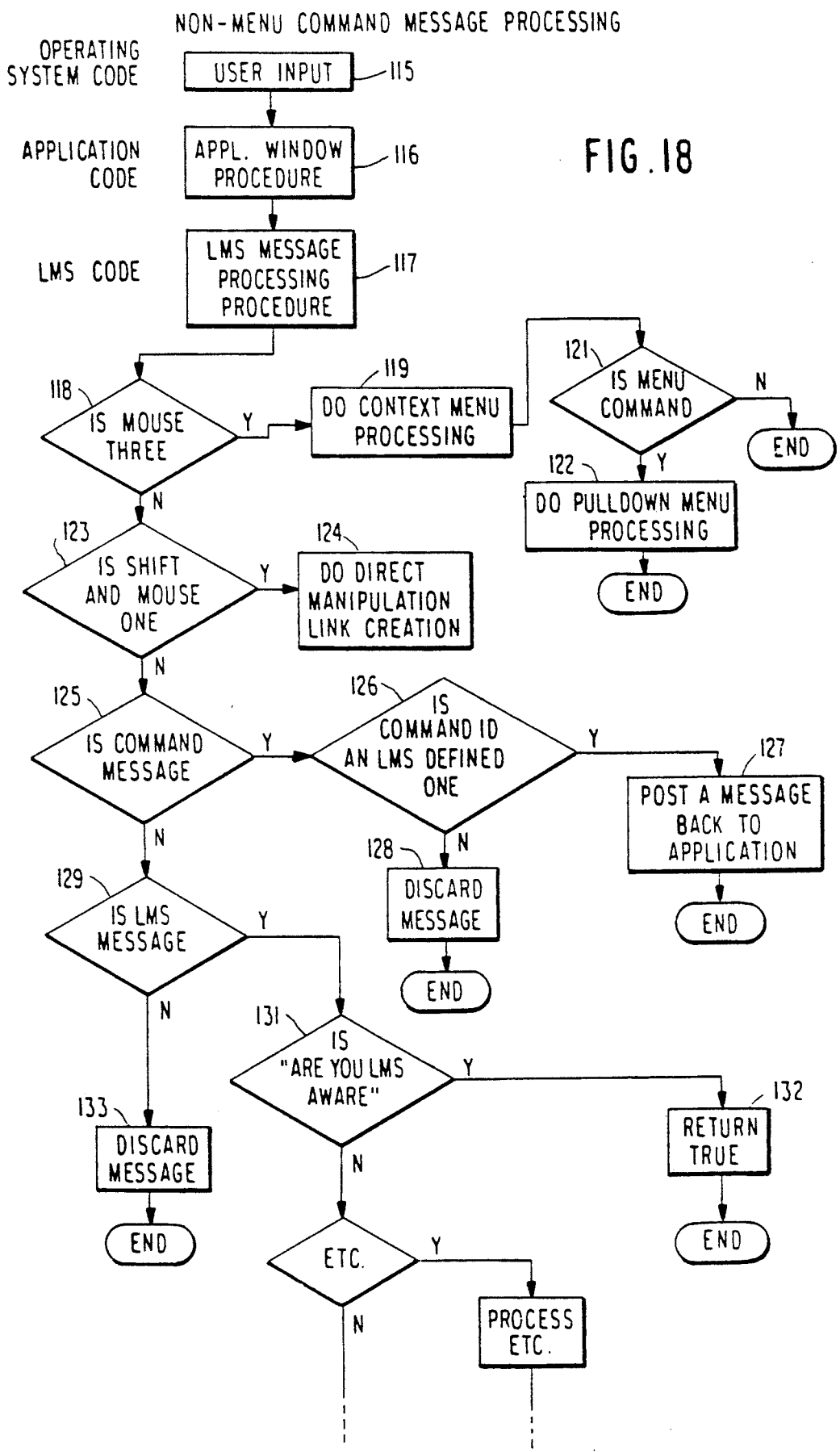
FIG. 18 is a flow diagram showing the logic of the non-menu command message processing performed by LMS.

Reference is made to FIG. 18 which is a flow diagram of the logic for the procedure for non-menu command message processing. Again, the user does some input at function block 115, and the operating system gives a message to the client application window procedure in function block 116. The window procedure will forward the message onto LMS in function block 117, as described previously.

This processing procedure assumes that LMS has gotten past the testing to see if the message is a menu command. The other messages besides menu messages include mouse messages, messages from other windows that are sent to LMS from LMS itself (e.g., messages such as asking another application if it is an LMS aware application), etc. The non-message command message processor first checks in decision block 118 to see if mouse button three is pressed. If so, context menu processing is returned in function block 119 and, in decision block 121, a test is made to see if a command was entered by the user or if the user selected cancel. If a command was selected, then LMS does the basic pull-down menu processing, as indicated in function block 122 and illustrated in FIGS. 16 and 17. Essentially, LMS executes the command with a notification to the client application, as described above. Remember that in the notation of the flow diagrams, every time "do 'menu pull-down processing'" appears in a flow diagram, the process does not go to the top of the flow diagram shown in FIG. 16 for menu pull-down processing but, rather, enters at function block 88 of FIG. 16.

Returning to decision block 118, if the mouse three button is not pressed, then a further test is made in decision block 123 to determine if the message is SHIFT key plus mouse button one. This is a way of creating a link and a marker. If so, LMS does that processing in function block 124. If not, a test is made in decision block 125 to determine if it is a command message. If so, a determination is made in decision block 146 as to what sort of command the command is. That is, is the command one that LMS has defined as a command? If it is, a message is passed to the application in function block 127. That message will again filter back down to LMS because the application will not want to process it, and then LMS will do its LMS command processing. If the message is not a command message, then LMS just discards it in function block 128 if the message is not one that LMS understands.

Referring back to decision block 125, if not a command message, then a test is made in decision block 129 to determine if the message is an LMS message; that is, is this an LMS specific message that LMS uses to communicate with itself? LMS running on behalf of different processes that are using LMS might send these messages back and forth to communicate with each other without involving the client application. If it is an LMS message, one example of that type of message might be a query as to whether the application is LMS aware, as indicated by decision block 131. If not, when that other window gets this message, it will not have any LMS processing procedure to call. Therefore, that window would just return false, indicating that it does not understand the message. But if this message goes to an application that is LMS aware, it will return true, as indicated by function block 132. The message will get filtered down to the LMS processing procedure, as described before. If, in decision block 129, the message is not an LMS message, the message is discarded in function block 133.

The end user interacts with objects on their screen by using the mouse. LMS manages mouse interactions with LMS objects (e.g., documents and link markers). LMS manages mouse actions in a number of ways.

Client applications typically forward mouse messages to LMS. When LMS receives these mouse messages, it determines if some hypermedia-specific action needs to be taken. Using this mechanism, LMS is able to control the mouse when it is over the client application's "client window" (main application workspace). When a client application first displays a document, it notifies LMS of this, informing LMS of the name of document and the handle of the window in which the document is displayed. LMS will then obtain, from the LMS database, all LMS objects associated with the document. LMS now has enough information to process mouse messages that occur in the client application's client area. This allows LMS to display context menus (see FIG. 9) over the client application's client window. When mouse messages get forwarded to LMS, LMS determines the state of the hypermedia objects (links, link markers, etc.) in the document, and can determine what types of items should be in the context menu (e.g., "Save markers", "Hide markers", etc.). This facility is also used for the operation of making "quick" links, whereby the user can simply mouse click over two points (either within the same document, or different documents and presenters) and have two link markers (one at each point) automatically created as well as the link between them. Typically, this is accomplished by the end user individually creating two link markers, and then creating the link. The above functionality is all accomplished without the aid or knowledge of the client application, and will be consistent for all client applications which utilize LMS services.

Since LMS link markers receive messages directly from the operating system, and the class of windows known to the operating system as "LinkMarker" is "owned" by LMS (i.e., the operating system invokes LMS code directly when a window of this type gets a message), mouse management over link marker windows is accomplished without the need for the client application to "forward" messages to LMS.

When a link marker receives a message (from the operating system) that the mouse is over it, LMS will change the mouse pointer appearance to indicate the presence of a link marker to the end user (this is especially useful since markers may be "invisible", i.e., the user may interact with them, but cannot see them). Additionally, this allows for LMS to handle many other types of mouse activities over link markers, such as "grabbing" a marker with the mouse and repositioning and/or resizing the link marker, displaying context menus (see FIG. 9) for link markers, and viewing the link marker's associated links.

LMS also has the ability to manage the mouse when the mouse is over windows which do not use LMS services. One situation where this occurs is when end users create link markers and links using "quick" link which is a fast path method for establishing links. In this situation, the user simply presses a mouse button and keyboard key while the mouse is over some part of a client application's document, and then "drags" the mouse to another point (either in the same document, or another document/presenter) and releases the mouse button (if at any time during this operation the mouse is over an area which is not a valid link termination point, the mouse pointer appearance will change to indicate this to the end user). This procedure allows link markers and a link to be established between the two points, all in one step. The only client application participation required during this processing is the forwarding of messages to LMS, as described above.

LMS implements this functionality by using operating system services to obtain exclusive use of the mouse (i.e., receiving all mouse messages, regardless of which window the mouse is over). When the mouse button is released (to complete the operation), LMS queries the system to determine which window, if any, the mouse is over. A message is then sent to that window to determine if it is an application which uses LMS services. If the window receiving the message uses LMS services, it need not (and will not) process this message, but will forward it to LMS which will respond that this application uses LMS services. If the target window of this process is an application that uses LMS services, a link marker will automatically be created for that application at location of the mouse pointer, and a link will be established with the starting point of the operation. If the response to the message is that this application does not use LMS services, then a link will be established to that application, but no marker will be placed in it (LMS refers to these types of applications as "unaware").

The end user may create link markers within the client application window, delete them, size them, change their text, and change their appearance style. With the exception of marker creation and deletion (which require the forwarded messages, as described above), this can all be accomplished without any client application participation. Since LMS "owns" the link markers (as described above and described in more detail below with reference to FIG. 20), LMS controls the painting and positioning of the link marker windows. Link markers may be made to invert the client application data below them, which appears to the user as highlighting, however no processing is required of the client application to achieve the inverted area.

Figure 19:
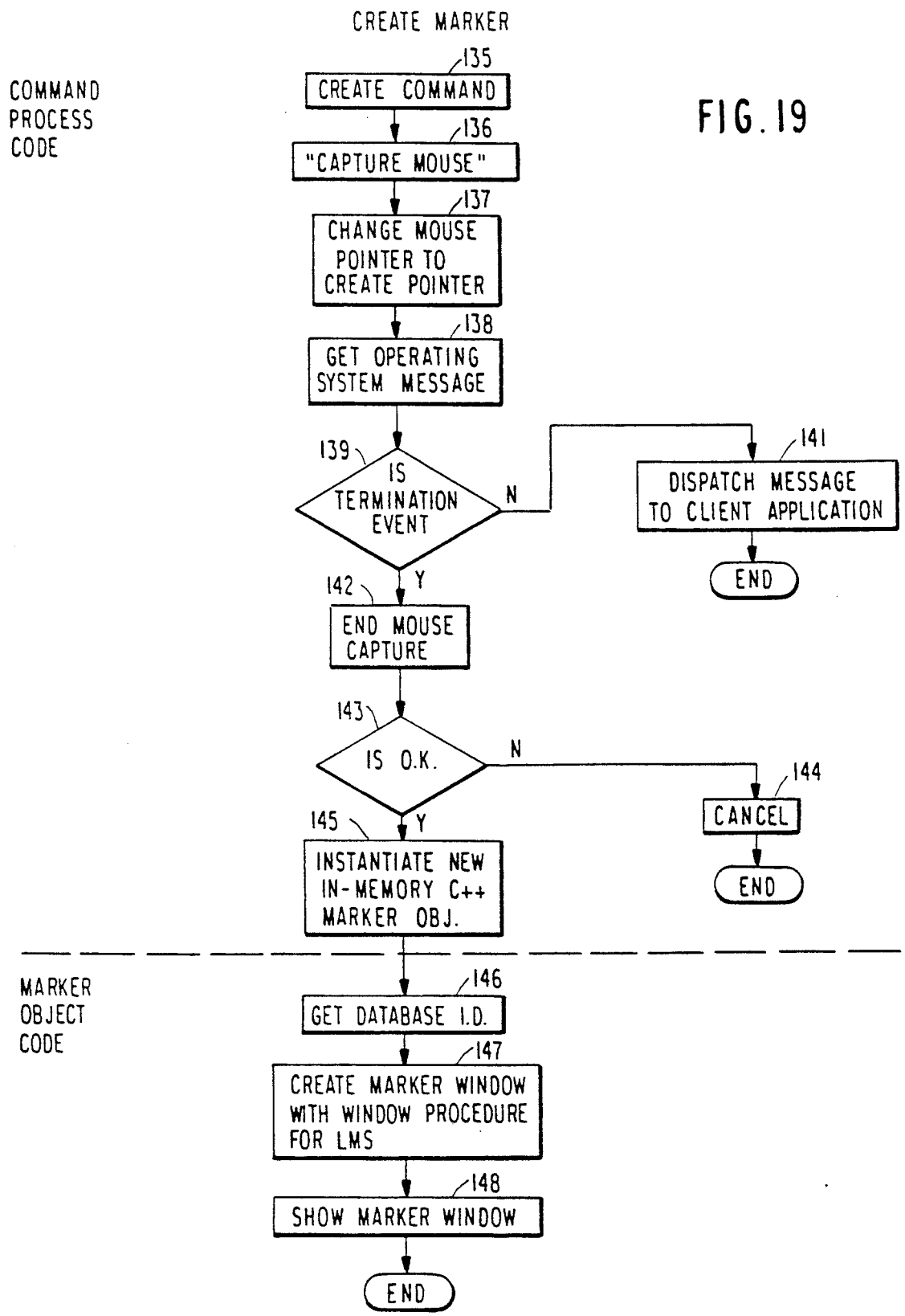
FIG. 19 is a flow diagram showing the logic of the create marker procedure performed by LMS.

Referring next to FIG. 19, there is shown a flow diagram of the logic of the create marker procedure of LMS. The process starts with a create command in function block 135. This means that one way or another, the create marker command has been received, whether from the link pull-down menu or from the context menu displayed when the user clicks on the client workspace in the client window of the application but not on a marker. In the case of clicking on the client workspace, the action may be considered as clicking on a document, so the context menu is called a document context menu, or simply a "doc. context menu". In any case, it is assumed in the flow diagram of FIG. 19 that a create command has come in from one of those sources.

The first thing that is done is that LMS captures the mouse in function block 136. That is a windowing term meaning that control of the mouse pointer is obtained. The mouse pointer is changed in function block 137 to a different pointer shape to indicate that LMS is in the process of marker creation. This shape is a tracking rectangle that the user moves around the screen indicating where they want to place the marker.

Next, the process waits for operating system messages in function block 138. This is done by inserting a new message processing loop so that the application can continue running, but LMS filters all messages before passing them to the application. Thus, function block 138 is a little loop called a get-message loop which keeps looking for messages. Normally it is the application itself that does that, but LMS exercises very tight control here. Every time a message comes in, LMS looks at it and determines in decision block 139 whether this is a message that terminates this capturing of the mouse. If not, the message is dispatched to the client application in function block 141; otherwise, the mouse capture is ended in function block 142. A test is then made in decision block 143 to determine whether the user canceled out of the marker creation process or did they truly want to continue. If the user canceled out, the process is canceled in function block 144; otherwise, if the user wanted to continue, then a new "marker" is created in function block 145. (The marker is an object in the context which that term is used in object-oriented programming languages.) Then the actual marker object gets a new identification (ID) from the database in function block 146, and a marker window is created in function block 147. This marker window is a visible manifestation of the marker, and whenever a window is created in a windowing system, a window procedure is assigned to be associated with that window, as discussed above. The window procedure for the marker window function resides in the LMS dynamic link library. That way, every time the marker is clicked on or any input comes to the marker, the link manager code is executed, thereby effectively eliminating any client application interaction. After the marker window has been created, it is then shown in function block 148.

Figure 20:
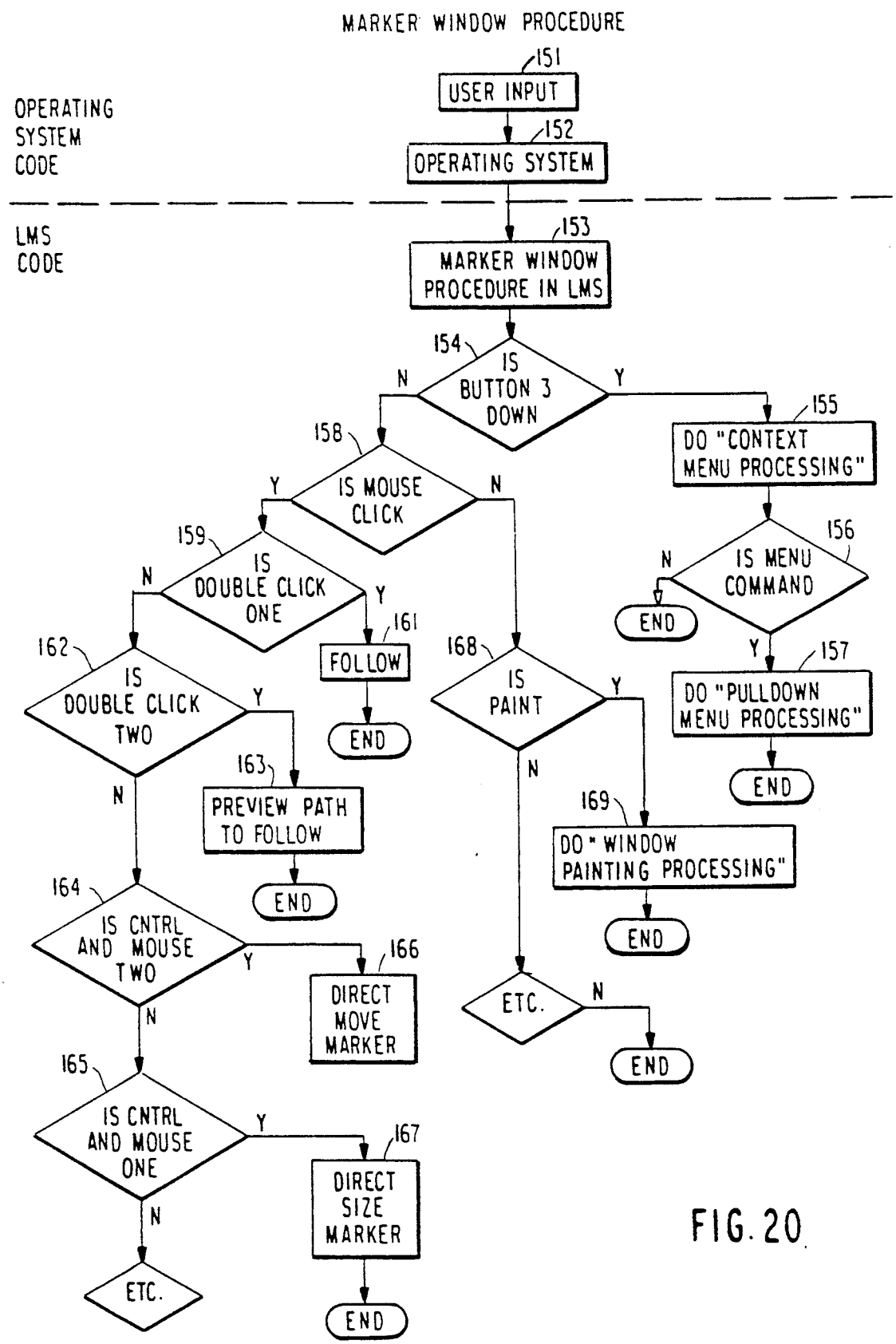
FIG. 20 is a flow diagram showing the logic of the marker window procedure performed by LMS.

Referring now to FIG. 20, the logic of the marker window procedure is shown. In the context of this invention, a link marker may be conveniently thought of as a window within an application window, and in fact that is what it is. The marker window procedure is similar to the client application window procedure or any window procedure, and the code for the marker window procedure resides in LMS. Messages are input by the user in function block 151 via the operating system in function block 152 to the marker window procedure in 153. When the marker window gets messages, the marker window procedure checks for user indications of things it has to do. For instance, a test is made in decision block 154 to determine whether button three down. If mouse button three is down, then the marker will display the marker context menu in function block 155 because, in the preferred embodiment of LMS, that is how a user brings up a context menu, by pressing buttons over a window. The context menu processor will return whether or not a command was actually selected from the context menu, as indicated in decision block 156. If a command was selected, then LMS essentially goes into the pull-down menu processing, as generally indicated in function block 157 and illustrated in FIG. 16, starting at function block 88, and in FIG. 17. That is, LMS gives a notification message to the client application before actually executing the command in case the client application wants to prevent LMS from executing the command. LMS also sends the client application a message after executing the command. Anytime LMS internally is about to execute a command, LMS always notifies the client application first with a special LMS message. And any time after LMS has performed a command, LMS always notifies the client application with a message saying LMS has performed the command.

What if the user input is just a regular mouse click as determined in decision block 158? If it is, a further test is made in decision block 159 to determine if the message is a double click on mouse button one. If so, then the follow-link operation is performed in function block 161. The C++ "marker object" knows all the links that are associated with it and all the information about ends of links, and all this information is stored in the database so LMS is able to do the follow link. On the other hand, if the message is a double-click on mouse button two, as determined in decision block 162, LMS will put up a dialogue box in function block 163 showing the user all the links that come out of the marker.

If the mouse click is not any of those mouse click messages, then LMS checks to see if a control key was pressed at the same time the mouse button was down, as indicated in decision blocks 164 and 165. In that case, LMS does some direct manipulation work. Direct manipulation means that the user presses a control key and, using the mouse, moves the marker in function block 166 or sizes the marker in function block 167.

Returning to decision block 158, if the message is not a mouse click, it is tested in decision block 168 to determine if it is a paint message. If so, the marker closes its window to be repainted in function block 169.

Figure 21:
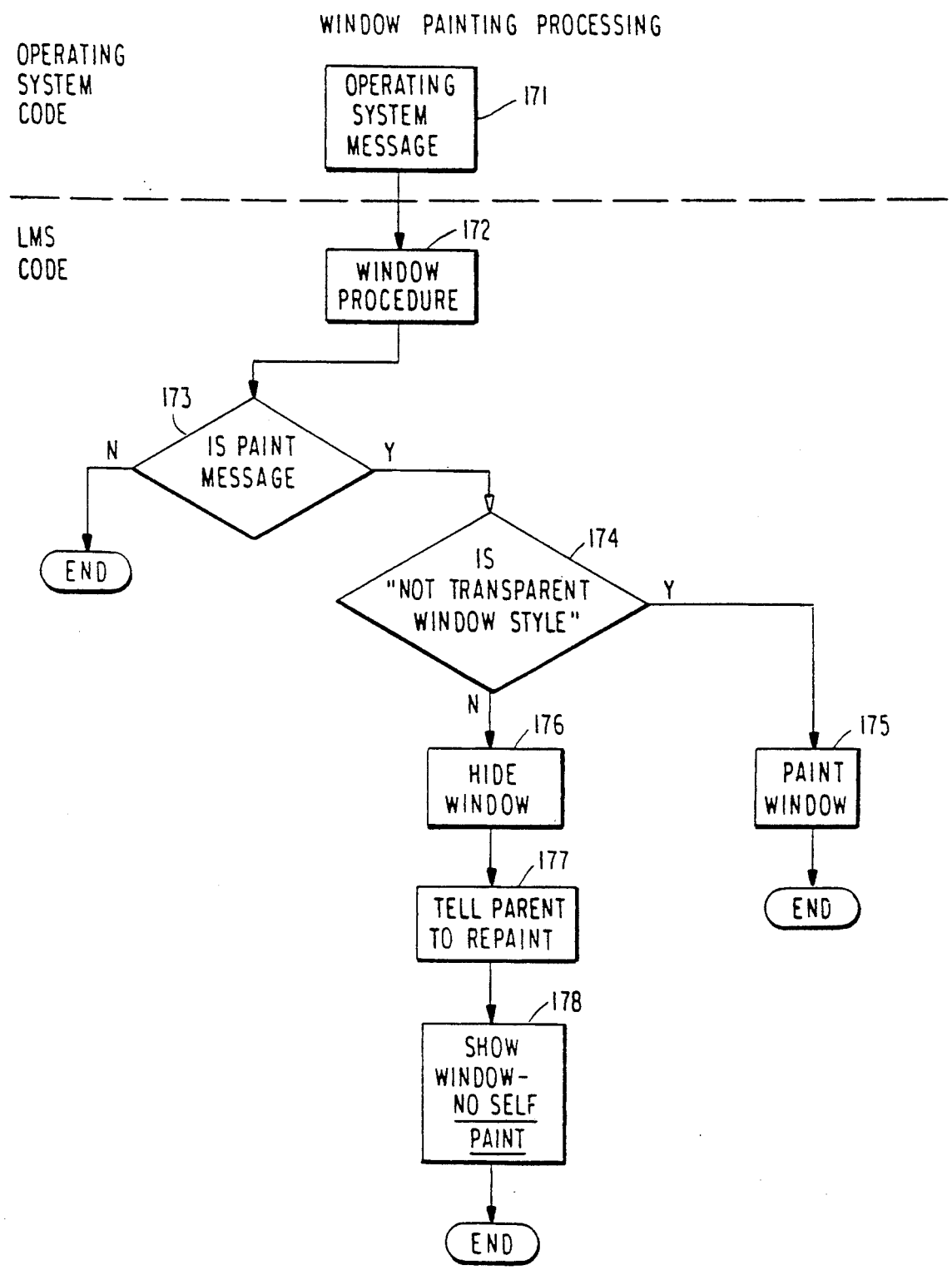
FIG. 21 is a flow diagram showing the logic of the window painting procedure which supports transparent or invisible windows.

Referring next to FIG. 21, the flow diagram shows the logic of the window painting processing. The operating system sends LMS a message in function block 171, as in the other processes described. The message this time comes directly into the marker window procedure 172 because markers get messages without having to go through the client application first. The marker window determines in decision block 173 whether the message is a paint message. If it is a paint message, that is, the operating system is saying that the window must be redrawn, the marker determines in decision block 174, by looking at the database, what the marker style is. There are two styles that are not transparent (i.e, you cannot see through them); one is called black and white, and is two dimensional, and the other is called push button, and which has a three dimensional appearance providing a visual depression movement when pressed. Any of the other styles, are transparent and are represented in a screen print as a video inverse or high-light frame as illustrated, for example, in FIG. 22.

If not a see-through type marker (i.e., a push button or a black and white), then the marker is painted in function block 175. But if it is a transparent marker style, then the marker is hidden in function block 176; in other words, the whole marker window is removed from the screen. When the marker window is removed from the screen, the parent window below is told to repaint itself in function block 177. This assures that everything, all the data in the parent window, is current and up to date. As soon as that is done, the marker is reshown in function block 178, but the parent window is not repainted unless it is desired to paint the border or do an inverse.

Figure 23:
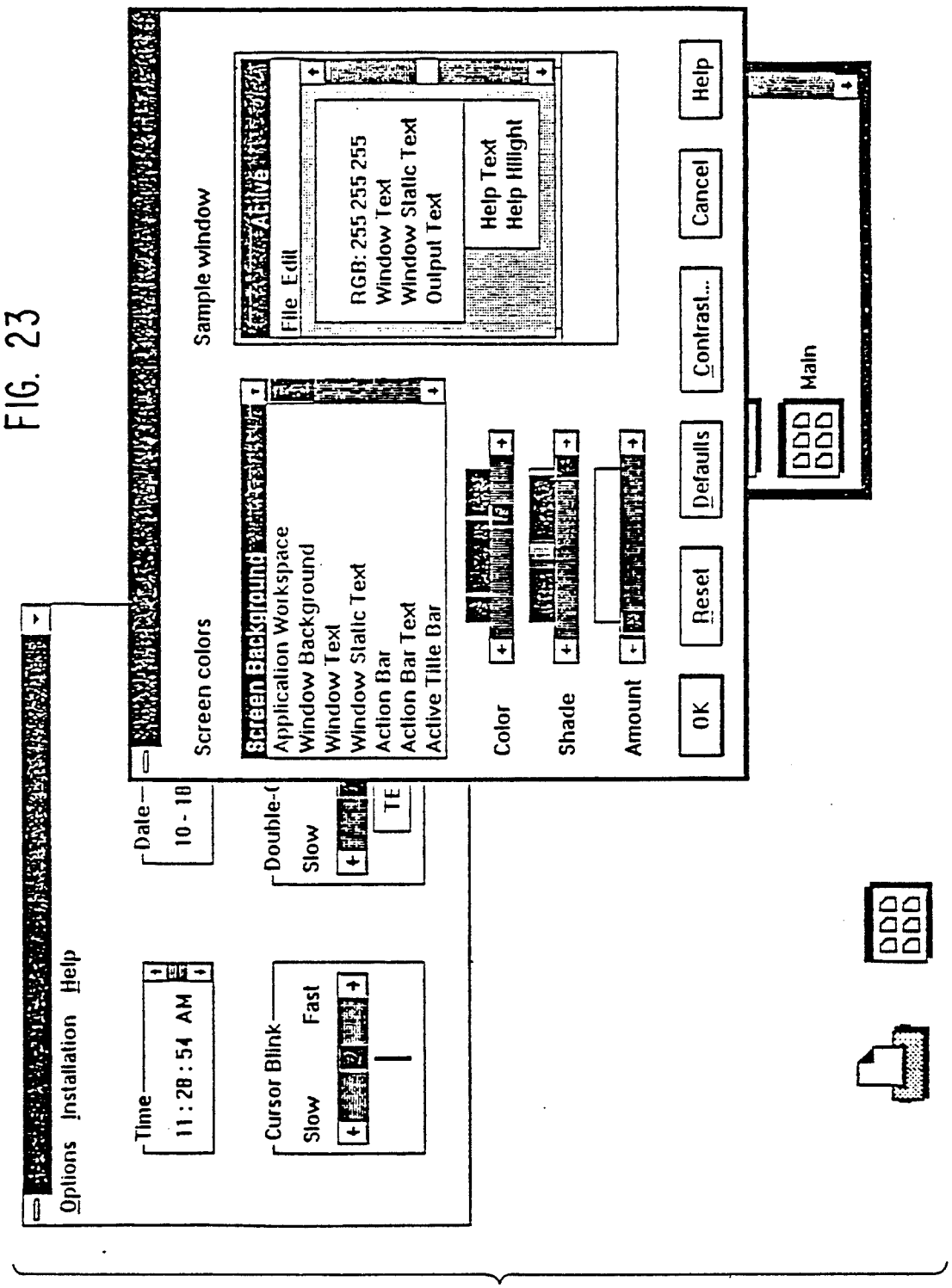
FIG. 23 is a screen showing multiple, overlying windows to illustrate the procedure normally followed when a window is painted on the screen.

Under Microsoft ® Windows and OS/2 PM, there are no bits reserved on the pallet for transparency, so a window can not be made that a user can see through and that would be updated correctly and properly at 15 all times. Windows and OS/2 Presentation Manager windows are opaque. Typically, when a window is created by an application, the window comes up on the screen; i.e., the operating system tells it to paint itself and it paints itself. Of course, in painting over any window, as by grabbing one window and putting it on top of another, what happens is that the operating system does not actually draw into the window; rather, the operating system fills the window with a white background, text or whatever. This is illustrated, for example, in FIG. 23 which shows many different types of windows, scrollbars, icons, pushbuttons, etc. The operating system creates the window by reserving an area of the screen and, when the mouse is clicked there, the operating system sends that window procedure messages, but the user is still able to see through the window to the window below it. So what appears on the surface to an implementation of transparent windows is actually something as simple as a window not painting itself.

Unfortunately, in practice, it is not quite that easy. If every time the operating system tells this new window that has been created to paint itself, one possibility is for the window to never paint itself, in order to be transparent. However, it will not really be transparent. All that happens is that the bits on that area of the screen will not be painted. So if another window is brought on top of the "transparent" window and then moved off, the window that the "transparent" window is sitting on top of will repaint itself except in the areas where the "transparent" window is because windows never paint over other windows. And the "transparent" window is not going to paint itself. The bits that were on the screen will be the bits from the third window that were on top of both the "transparent" window and the window it sits on, so the screen is going to be incorrectly presented.

The solution to this problem is contained in the window paint processing procedure shown in FIG. 21. Specifically, when that other third window is brought on top of our transparent window and then moved off, the operating system sends the transparent window a paint message. Rather than just totally not painting, what the window does is to recognize that the bits on this part of the screen are from that third window and, since that third window has moved away (as indicated by the receipt of the paint message), the transparent window must cause what is underneath to be shown. This is done by the transparent window hiding itself at function block 176 in FIG. 21. There are functions in the operating system to do that. The parent window will then get a paint message from the operating system which the transparent window will teel the parent window to act on immediately. At this point, the parent window will paint itself in function block 177. Windows will never paint over another window that is visible but will paint other screen areas if a window is not visible (i.e., hidden) in that screen area. So the procedure is to hide a window and tell the parent window to paint itself in this particular area where the transparent window was. In this way, the screen is all refreshed, up to date and current.

Figure 22:
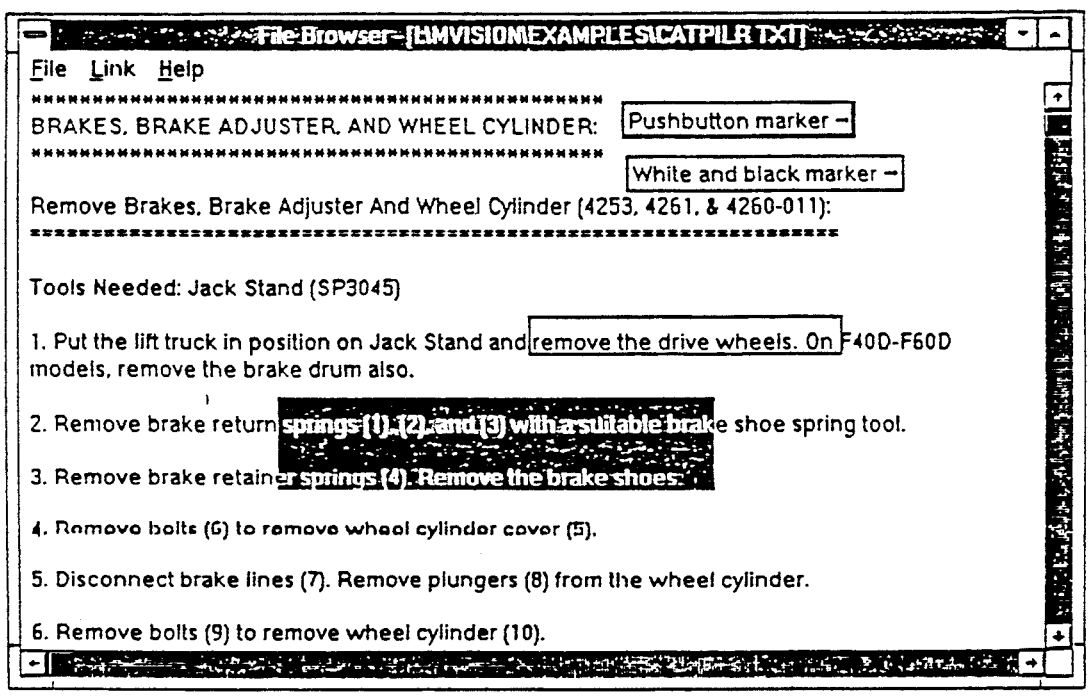
FIG. 22 is a screen print showing the location of an invisible marker (i.e., window) by reverse video highlighting.

Now, the transparent window must be shown again. When the transparent window is shown again, the operating system recognizes this and directs the window to paint itself, but the transparent window will not paint itself so that the end user can look through the transparent window to the data below This all happens instantaneously and effectively produces transparent windows on the PM of OS/2. Again, transparent windows may do some painting if that is desired, like inverting the bits that are in the rectangular region of the screen occupied by the transparent window to produce an inverse video highlighting or draw a wire frame on the boundaries of the window as shown in FIG. 22. In FIG. 22, which is a screen print that shows an inverse video highlighted text, on the screen 14 (FIG. 1) it is not really highlighted text; it is actually a transparent window there.

Figure 24:
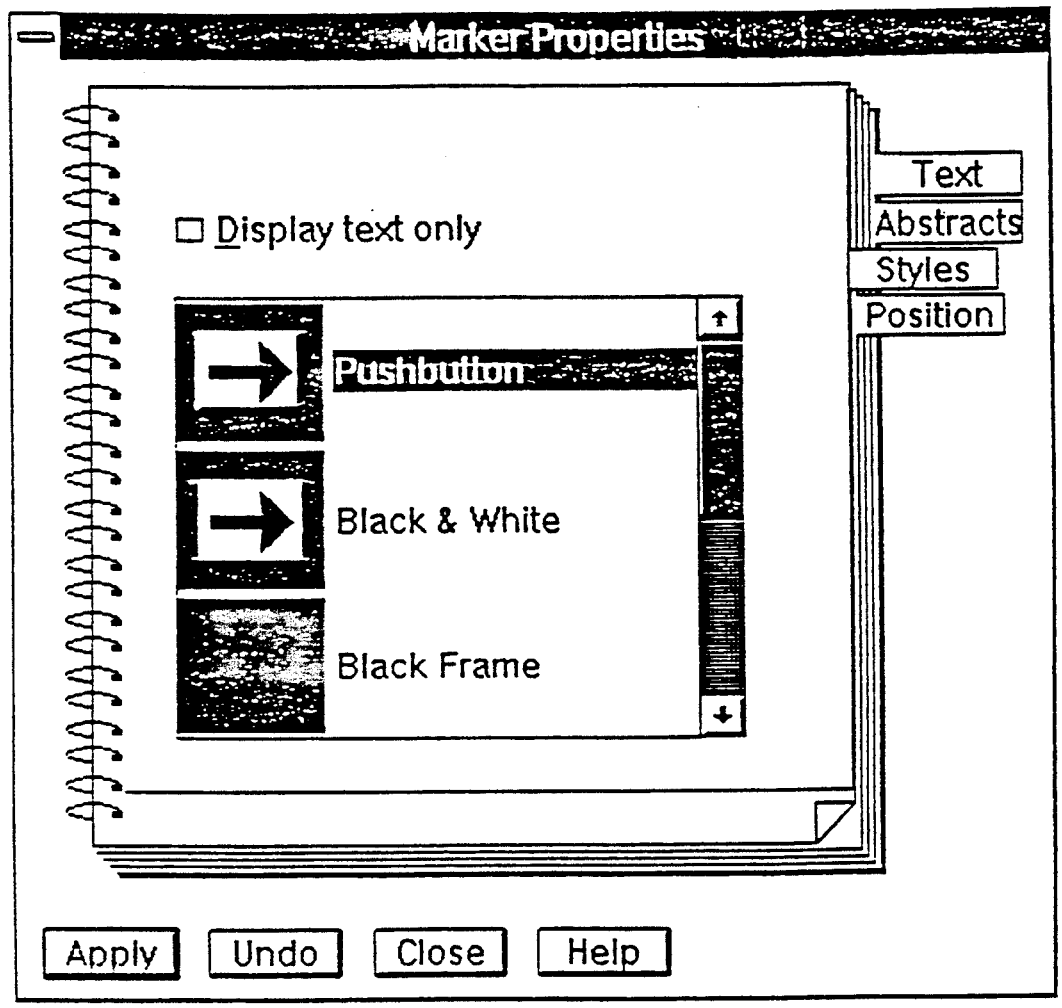
FIG. 24 is a screen showing an example of an LMS dialog box for selecting a link marker style.
Figure 25:
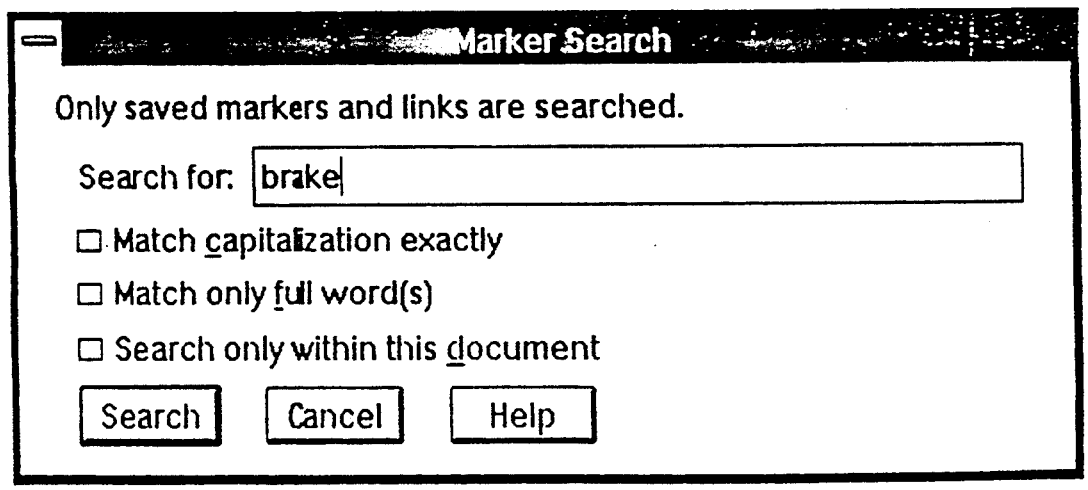
FIG. 25 is a screen showing another example of an LMS dialog box for managing links.
Figure 26:
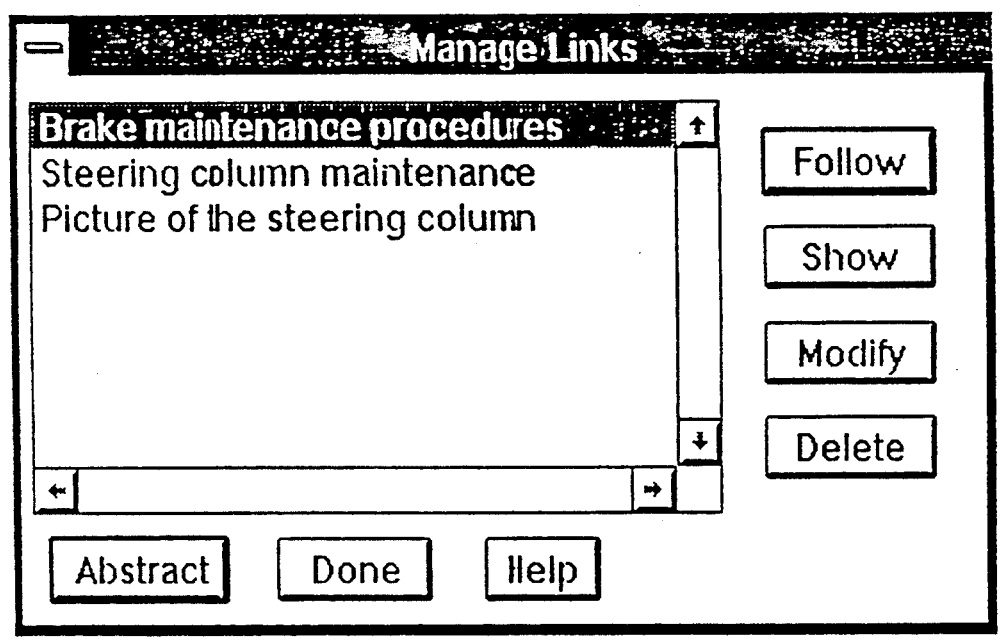
FIG. 26 is a screen showing a third example of an LMS dialog box for initiating a search of the LMS hypermedia database.

In addition to menus, another method of interaction between an end user and an application is the use of dialog boxes. Dialog boxes gather information needed for particular tasks from the end user. LMS provides and manages all dialog boxes necessary for a client application to provide full hypermedia support. FIGS. 24, 25 and 26 give examples of some of the dialog boxes provided by LMS. More specifically, FIG. 24 shows an example of the dialog box used to prompt the end user to specify the style of a link marker. FIG. 25 shows an example of the dialog box used to prompt the end user to select a link for purposes of management; i.e., displaying the link marker abstract, follow the link, etc. FIG. 26 shows an example of the dialog box to prompt the user to enter a keyword for purposes of a hypermedia database search.

The client application need not call any LMS services in order to display or manage the dialog boxes; LMS automatically provides this support. This ensures that all applications using LMS services will provide a consistent set of hypermedia dialog boxes, across client applications.

LMS contains the definitions (i.e., appearance/behaviors) of all dialog boxes. When the end user requests a hypermedia service (typically using menus), LMS will begin executing the request. If during this execution it is determined that dialog boxes need to be displayed (e.g., more information is needed), LMS will display them. Since all of the hypermedia dialog boxes are concerned with LMS objects (e.g., links, link markers, etc.), LMS is able to apply the end user's request to the object without the cooperation of the client application.

Figure 27:
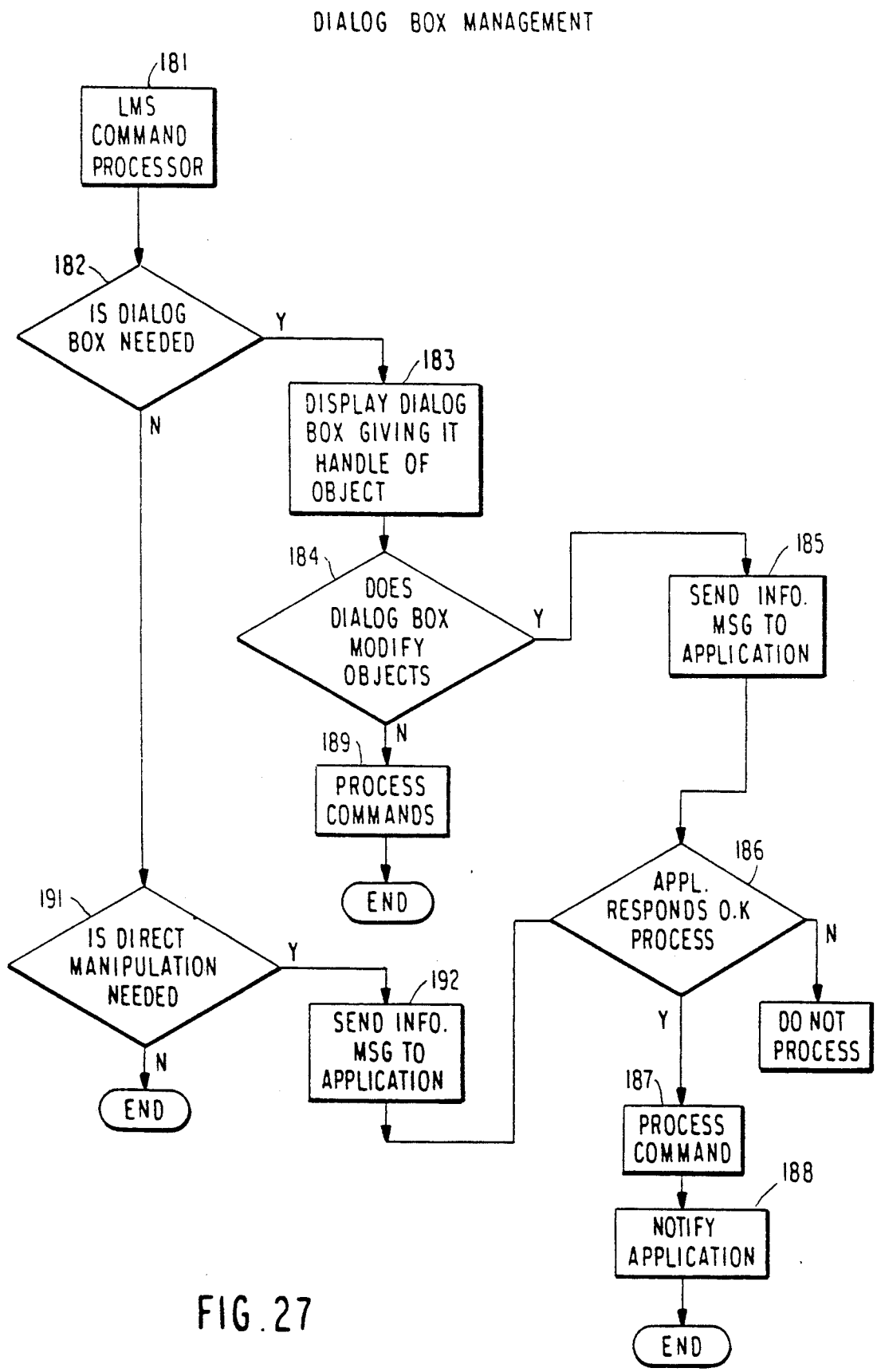
FIG. 27 is a flow diagram showing the logic of the dialog box management procedure performed by LMS.

FIG. 27 is a flow diagram of the logic of the dialogue box management. For each command that the LMS command processor 181 performs, such as create markers, create links, modify things, and the like, a test is made in decision block 182 to determine whether a dialogue box is needed. If the answer is yes, then LMS displays the dialogue box in function block 183. These dialogue boxes are stored with the LMS resources just like menus; they are not stored with the client application. The whole user interface is stored with LMS, which means it is modular so that if a new version of the LMS is introduced, there will be a new user interface that appears to the end user as part of the client application without any rewrite of client application code.

In any case, the dialogue box is displayed according to what object LMS is working on; whether it is a marker or a document or a link, etc. If the dialogue box does modify objects based on user interaction with it, as determined in decision block 184, then a message is sent to the application in function block 185 telling the application that LMS is about to change something, at which point the application responds in message block 186 whether it is okay to continue. If the application says it is okay to continue, then LMS processes the command in function block 187 and notifies the application in function block 188, as before.

Returning to decision block 184, if the dialog box is not going to modify an object, then LMS does not even bother asking the application if it should do this or not. Instead, LMS processes the command in function block 189.

Finally, if the dialogue box is not used as determined by the test in decision block 182, a further test is made in decision block 191 to determine if direct manipulation is needed. Direct manipulation, again, is grabbing markers with a mouse, not selecting menu items; that is, just using the keyboard and the mouse to select things and grab them and do things to them, make links, etc., without any menus involved. If some sort of direct manipulation is needed, then LMS sends a message to the application in function block 192. For instance, if the direct manipulation is to move a marker which, by the way is an item that a user could select from a pull-down menu, LMS sends the application a message saying that it is about to move the marker just as if the user had selected that function from a pull-down menu, so that the client application does not have to be sensitive to the method the user is using to perform these activities. As before, LMS waits for the application to respond whether or not it should proceed. If the application responds that it is okay to proceed, LMS processes the command in function block 187 and then, as always, after processing the command, notifies the application in function block 188.

As is true of other areas of the LMS supplied EUI, although the client application is not required to provide any hypermedia support, they may modify, enhance, or prevent the displaying of the LMS supplied dialog boxes. Additionally, services are provided for client applications to display LMS dialog boxes at times of their choosing, rather than only when LMS finds it necessary.

All information needed to support links between documents is maintained by LMS in a separate database known as a web (see FIG. 5). The files containing the client application's data need not be modified in order for that application to utilize LMS services; rather, a conceptually parallel "view" or "overlay" of all of the hypermedia objects is stored in the web database. The client application need not be concerned with the format of this database nor with accessing the database; these concerns are handled entirely by LMS. This database may be used in a single-user workstation environment, or a multiple workstation/user/process (e.g., network) environment permitting shared database access, including update. The LMS hypermedia objects thus remain persistent (in the database) after the client application has ended, and they will be made available again when the client application is again used to render its document(s). This design, which offloads much work from the client application, is described below.

The hypermedia objects are documents, presenters, link markers, and links. LMS will save all new and modified hypermedia objects into the database, and remove all hypermedia objects from the database for which deletion has been requested, when requested to do so (either by the end user or the client application), as well as when the client application is closed (unless requested to not do so by either the end user or the client application).

When a client application is rendering its data, object creation can be manifested in either or both of two ways:

Hypermedia object previously existed in the database: When the client application identifies itself and its document to LMS, LMS automatically loads the relevant hypermedia object data from the database and displays the link markers appropriate for the portion of the document currently being displayed by the client application.

Hypermedia object does not exist in the database: Presenter objects, which contain LMS data about the client application (e.g., its name), are automatically created by LMS whenever a client application first becomes known to LMS (i.e., when the client application "checks in" with LMS via the LMS API). The same is true for document objects. LMS creates link marker and link objects whenever requested to do so by either the end user (using the LMS EUI), and/or the client application (using the LMS API). Examples of the latter (LMS API) case might be heuristic or other artificial intelligence client applications; or utility programs written to dynamically (i.e., without end user interaction) create documents, link markers, and link objects for previously existing (perhaps large) corpora of machine readable information, the format, content, and semantic associations of which are known or discoverable by the programs such that a highly useful, perhaps non-lineal, web database of hypermedia associations would be obtained (e.g., machine maintenance information, encyclopedias, medical information, personnel skills information, education courses which would permit structured learning and/or virtually peripatetic discovery, sales/catalogue information, a dictionary, etc.).

Figure 28:
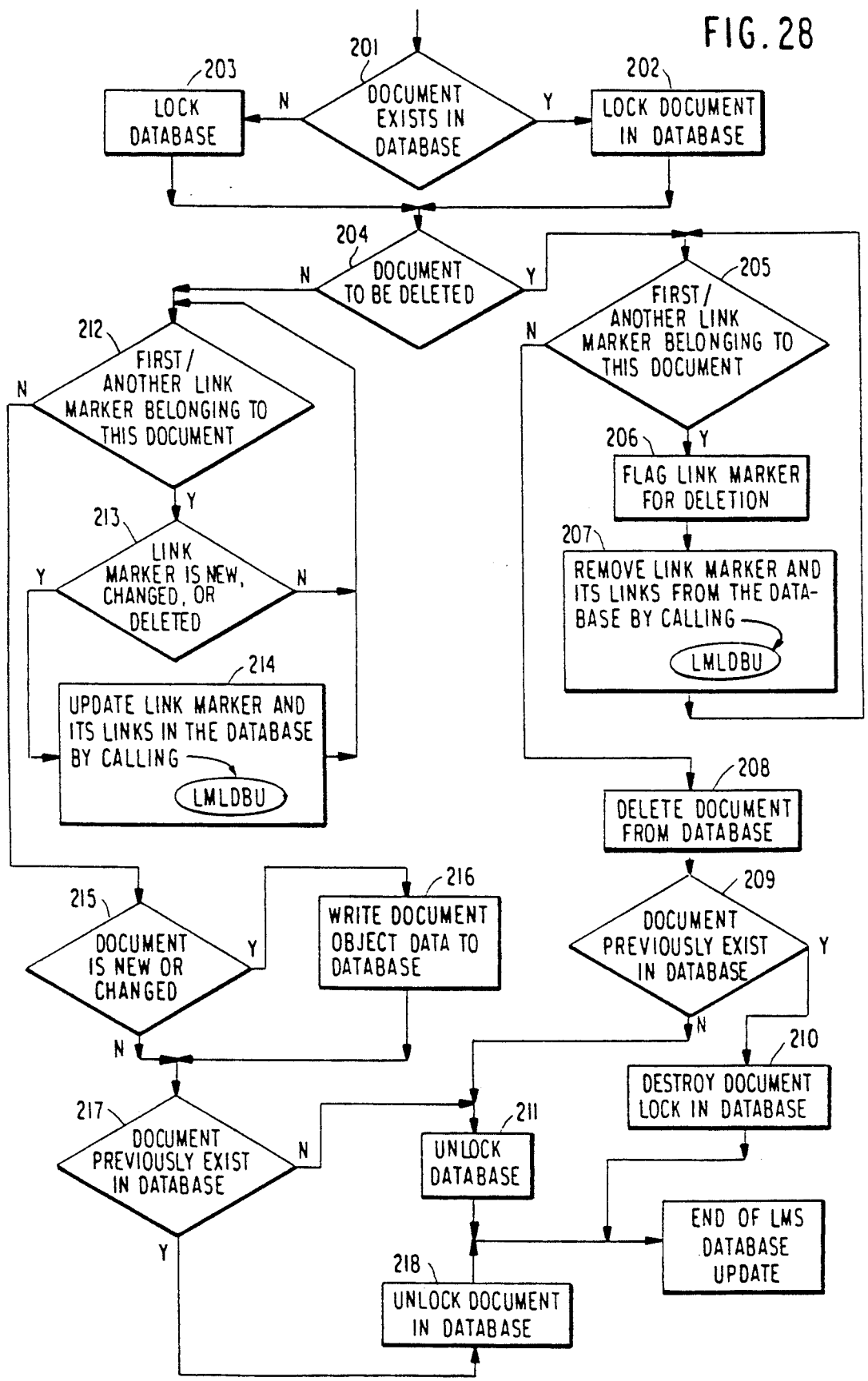
FIG. 28 is a flow diagram showing the logic of the LMS database update procedure.
Figure 29A:
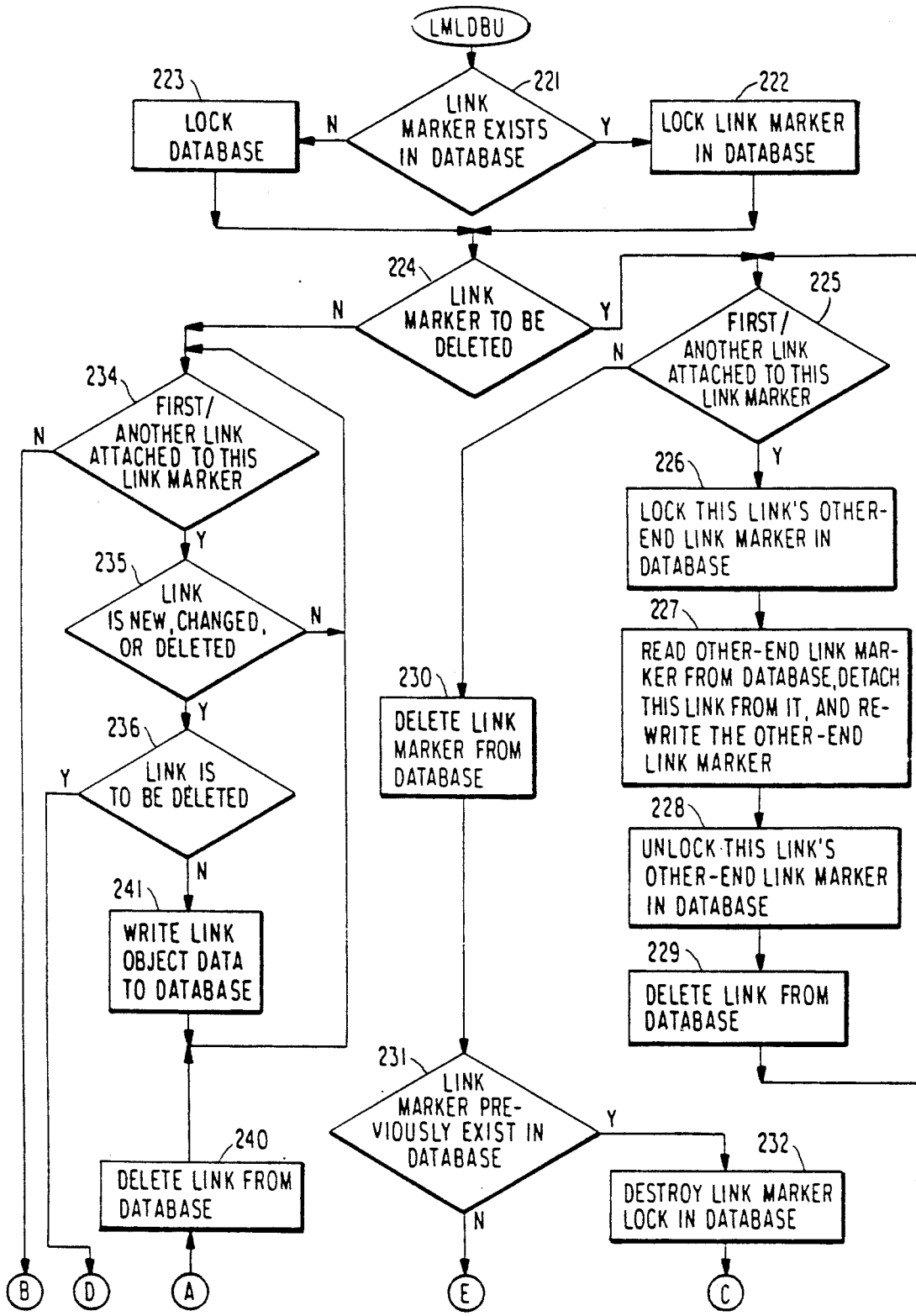
FIGS. 29A and 29B are a flow diagram showing the logic of the link marker and link database update procedure called from the procedure shown in FIG. 28.
Figure 29B:
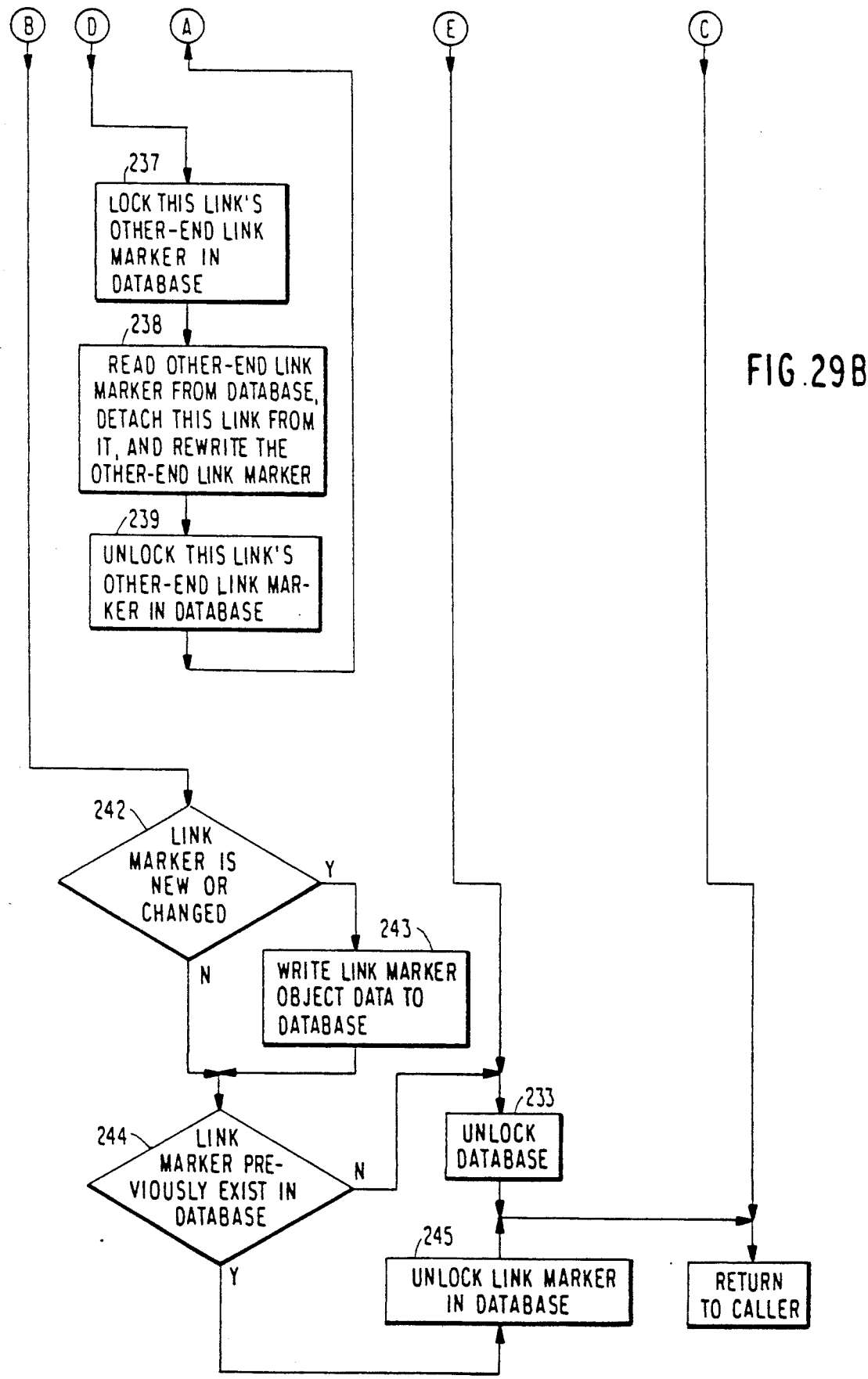

FIGS. 28 and 29 are flow diagrams pertaining to LMS database maintenance. The procedure illustrated in FIG. 29 is called from the procedure in FIG. 28. The database maintenance procedures are invoked whenever the user of the hypermedia system creates, changes or deletes a document, link marker or link. In FIGS. 28 and 29, references to lock and unlock when used in the context of database objects is intended to describe the scope of their availability to others. Lock means to obtain exclusive use, and unlock means to release exclusive use and thereby make available for others. Therefore, if one process locks an LMS document database object, then no other process can gain access to that object in the database until the object is unlocked. If a process locks the (entire) LMS database, then no other process can subsequently gain access to any object in the database until the database is unlocked.

Referring first to FIG. 28, the LMS database update procedure begins by testing in decision block 201 to determine if the document which is the subject of the update exists in the database. If it does, the document is locked in the database in function block 202, otherwise, the database is locked in function block 203, but in either case, a further test is made in decision block 204 to determine if the document is to be deleted. If so, the process enters a first loop to identify and, then remove the link markers belonging to the document. The loop begins with decision block 205 where a test is made to determine if this is the first or if there is another link marker belonging to this document. If so, the link marker is flagged for deletion in function block 206 and, then in procedure 207, the link marker and its links are removed from the database. This is done by calling the link marker and link database update procedure described in more detail with reference to FIG. 29 below. When a return is made from this procedure, the process loops back to decision block 205.

If the test in decision block 205 indicates that there are no link markers or that all link markers have been flagged, the document is deleted from the database in function block 208. Then a test is made in decision block 209 to determine if the document previously existed in the database. If so, the document lock is destroyed in the database in function block 210 before the procedure ends; otherwise, the database is first unlocked in function block 211 before the procedure ends.

Returning to decision block 204, assuming that the document is not to be deleted, a second loop is entered to identify link markers belonging to the document and then perform the update required. This loop begins with decision block 212 where a test is made to determine if this is the first or if there is another link marker belonging to this document. If so, a further test is made in decision block 213 to determine if the link marker is new, changed or deleted. If so, the procedure 214 is called to update the link marker and its links in the database. Procedure 214 is the same as procedure 207 and, again, is described in more detail below with reference to FIG. 29. When a return is made from procedure 214 or if the link marker is not new, changed or deleted in decision block 213, the process loops back to decision block 212.

When all the link markers have been identified and updated, the loop exists to decision block 215 where a test is made to determine if the document is new or changed. If so, the document object data is written into the database in function block 216. In either case, a test is next made in decision block 217 to determine if the document previously existed in the database. If so, the document is unlocked in the database in function block 218 before the procedure ends; otherwise, the database is unlocked in function block 211 before the procedure ends.

Turning next to FIG. 29, when the link marker and link database update procedure is called at procedure 207 or 214 in FIG. 28, a test is first made in decision block 221 to determine if the link marker exists in the database. If so, the link marker is locked in the database in function block 222; otherwise, the database is locked in function block 223. In either case, a test is next made in decision block 224 to determine if the link marker is to be deleted. If so, the procedure enters a first loop to identify the links attached to the link marker and then to delete those links. The loop begins with decision block 225 where a test is made to determine if this is the first or if there is another link attached to the link marker. If so, the link's other-end link marker is locked in the database in function block 226. Then, the other-end link marker is read from the database, the link is detached from it, and the other-end link marker is rewritten in the database in function block 227. The link's other-end link marker is unlocked in the database in function block 228, and the link is then deleted from the database in function block 229 before the process loops back to decision block 225.

When all links have been identified, the loop exits to function block 230 where the link marker is deleted from the database. Next, a test is made in decision block 231 to determine if the link marker previously existed in the database. If so, the link marker lock is destroyed in function block 232 before the process ends; otherwise, the database is first unlocked in function block 233 before the process ends.

Returning to decision block 224, if the link marker is not to be deleted, the process enters a second loop to identify the links attached to the link marker and perform the required update. This loop begins with decision block 234 where a test is made to determine if this is the first or if there is another link attached to the link marker. If so, a further test is made in decision block 235 to determine if the link is new, changed or deleted. If so, a test is made in decision block 236 to determine if the link is to be deleted. If so, the link's other-end link marker is locked in the database in function block 237. Then the other-end link marker is read from the database, the link is detached from it, and the other-end link marker is rewritten in the database in function block 238. The link's other-end link marker is unlocked in the database in function block 239, and the link is deleted from the database in function block 240 before the procedure loops back to decision block 234. If the link is not to be deleted but it is new or changed, the link object data is written to the database in function block 241 before the process loops back to decision block 234.

When all the links have been identified and updated, the loop exists to decision block 242 where a test is made to determine if a link marker is new or changed. If so, the link marker object data is written to the database in function block 243. In either case, a further test is made in decision block 244 to determine if the link marker previously existed in the database. If so, the link marker is unlocked in the database in function block 245 before the procedure ends; otherwise, the database is unlocked in function block 233 before the procedure ends.

While LMS provides a mechanism for off-loading work from client applications, it is not desirable to restrict the client application. Sometimes when work is off-loaded, the application can actually be restricted in its functionality. That is why LMS always sends notification messages before it acts on commands.

The client application is provided a way to store information of its own liking with certain LMS objects, such as markers and links in particular. For instance, if a text editor application has enabled itself with link manager services and it wants to know with what line number in its file the marker is associated, LMS does not understand client application data, so LMS does not know what a line is. To solve this problem, an area is provided in each LMS object, specifically markers and links, called user data, and APIs are provided to access this area of data. Basically, this is an area LMS does not understand the data stored there. It is an area where applications can store data. LMS does not look at the data since it is raw binary data and the application can store whatever it likes there. For instance, if an application knows a marker belongs on line 5, then the application can set some structure in the user data, or just one integer if it wants, saying this marker goes on line 5. Now, LMS simply stores data away in the web data base with that particular marker object. Now, next time that editor shows that document and tells LMS to load up all the markers and links, LMS will go through each marker, enumerating the markers using the functions provided by LMS and, as it enumerates, for each marker it will identify the user data associated with this marker. In the example given, that is the same user data that the application stored, and LMS will simply provide the data that the application had stored. While LMS will not know what the data means, the application will recognize it as meaning that this marker goes on line 5. At that point, the application can through the API to reposition the marker or do whatever the application wants with it.

The same is true for links. Links have the user data which behaves exactly the same as marker user data. An example usage of link user data might be the case where every time a link is established, the application wants to keep information specific about what its state was when that link was created; e.g., whether an application has the ability to have or not have a title bar. What the application may want to do is to store that link user data (i.e., the fact that it does not have a title bar when the link was completed). At another time if it does have a title bar, it might store in that link. Then when that link is followed and the application comes up and loads its document, the application checks the user data in this link. The user data informs the application that when this link was created, the application did not have a title bar, so the application hides its title bar, but when the other link is found, the application will find that the user data here says that it did have a title bar, so a title bar is displayed.

LMS does not understand the user data; it's like a little note pad that applications can keep with each link and each marker. Additionally, LMS has something called the user key with both links and markers which are ways for applications to quickly sort through and filing a particular marker or particular link. It is a key, so if an application always wanted to access one particular marker item but many markers were associated with a document, perhaps thousands, the application could assign the marker a particular user key which is a long extra value. Most LMS functions take the user key as a parameter, so if a user wanted to retrieve the first marker, LMS would just return the first marker that we find out of the whole set of markers. But if the user wanted to retrieve the first marker with the user key of 10, then LMS would do the searching through all the markers and determine which marker has a user key of 10.

LMS provides for the deletion of hypermedia objects by the end user (using the LMS EUI), as well as by the client application (using the LMS API). When a link is deleted from a link marker, LMS will automatically remove its other end from the link marker to which the other end was attached. When a link marker is deleted from a document, LMS will automatically delete all of the links attached to it. When a document is deleted, LMS will automatically delete all of the link markers for that document.

The attributes of documents, link markers, and links may be modified by the end user (using the LMS EUI) and/or the client application (using the LMS API). For example, the style, size, location, etc. of a link marker may be changed using these facilities.

Since all of the information regarding link markers, links, documents, and presenters is kept in a database managed by LMS, LMS is able to determine which presenter to launch with which document when the end user attempts to follow a link. Since link markers get and process their own messages with no client application interaction (see the "Mouse processing" above), LMS can determine where links go (e.g., presenter P is to render document D positioned, if necessary, to link marker M) by querying the database, and, since LMS has the ability to launch (start) applications, LMS enables end users to follow links without requiring any client application participation whatsoever.

Even though LMS goes to great lengths to offload almost all of the work needed to provide hypermedia support (and hence reduce client application coding effort and development time), it is not desirable to prevent client applications from being able to exert control over the behavior and data modifications of the hypermedia system. LMS provides this controllability through messages and Application Programming Interface (API).

As previously mentioned, the LMS push-button style of link marker has two substyles, one, which is "three dimensional" in appearance and has visual depression-movement when "pressed," and another, known as "black and white," which is two dimensional in appearance. Both of these can optionally be made to contain text which would briefly describe that information which would be obtained if one or more of the link marker's links were to be navigated (traversed). Therefore the link marker's text, if present, can be thought of as a mini-abstract of the information located at the other end of the link marker's links, and will be treated as such by the search logic as described below.

In addition to the text contained in a link marker, LMS implements a link marker abstract object which is owned by the link marker. The link abstract data is defined to be summary text information about the information that can be found at the location of the owning link marker. Thus, when LMS presents a list of candidate target link markers to the user (either as a result of the user "clicking" on a link marker with more than one link emanating from it, or as the result of performing a link marker abstract search, each candidate target link marker will be represented in the list by one of the following: (1) the target's short abstract text, but if none exists then (2) the target's parent document name, but if none exists then (3) the target's presenter name. Therefore, having at least short abstract data for a link marker can be useful for providing meaningful distinctions for the end user when displaying a list of candidate navigation targets, as well as for use in searching. The link marker abstract object, if it exists, consists of up to two text parts, the short and long abstract text, either or both of which may exist.

The link marker abstract short text data is intended to be brief descriptive text suitable for display on one line. The link marker abstract long text data is intended for use when it is desirable to provide more voluminous information about the information that can be found at the owning link marker location. This text can be as much as several tens of thousands of characters, more for some national language characters sets. The long abstract text will only be presented to the end user upon request, but it will always be examined during abstract searches. If it is desirable, in anticipation of searches, to specify keywords not otherwise in the text, a guideline would be to place them at the end of the long abstract as a courtesy to the end user who is probably more interested in reading the descriptive text first.

A search may be initiated through either the LMS EUI or LMS API. If initiated via the LMS EUI then the results (a list representing the candidate target link markers) will be displayed so that the end user may examine them and, if so desired, selectively request that the information represented in the list be displayed. If initiated via the LMS API then a list of the candidate target link markers is made available to the caller. Either way, the limiting search parameters and search logic is the same (the LMS EUI internally uses the LMS API). Only data in the hypermedia LMS database will be searched. If an end user or client application has added/modified/deleted any link marker text or link marker abstract data, but those changes have not (yet) been reflected in the database, then the changes will not be reflected in the search results.

A search may be limited/qualified through the specification of any combination of four criteria:

(1) The text string search parameter is the data which the search facility is to try and find in the database.

(2) The upper/lower case character insensitivity search parameter indicates whether or not the search facility is to consider compared strings as matching when the only difference is one of upper/lower case. For example, whether or not "care for the young" should be considered as matching "Care For The Young" is determined by this parameter.

(3) The word alignment search parameter indicates whether or not the search facility is to consider otherwise matching strings as matches if the database data begins or ends other than at the beginning or end, respectively, of a text word. For example, whether or not a search parameter of "are for you" should be considered as matching database data of "prepare for youthful" is determined by this parameter.

(4) The document identifier search parameter indicates whether or not the search facility is to limit the search to a particular document vs. doing a database-wide search.

Figure 30:
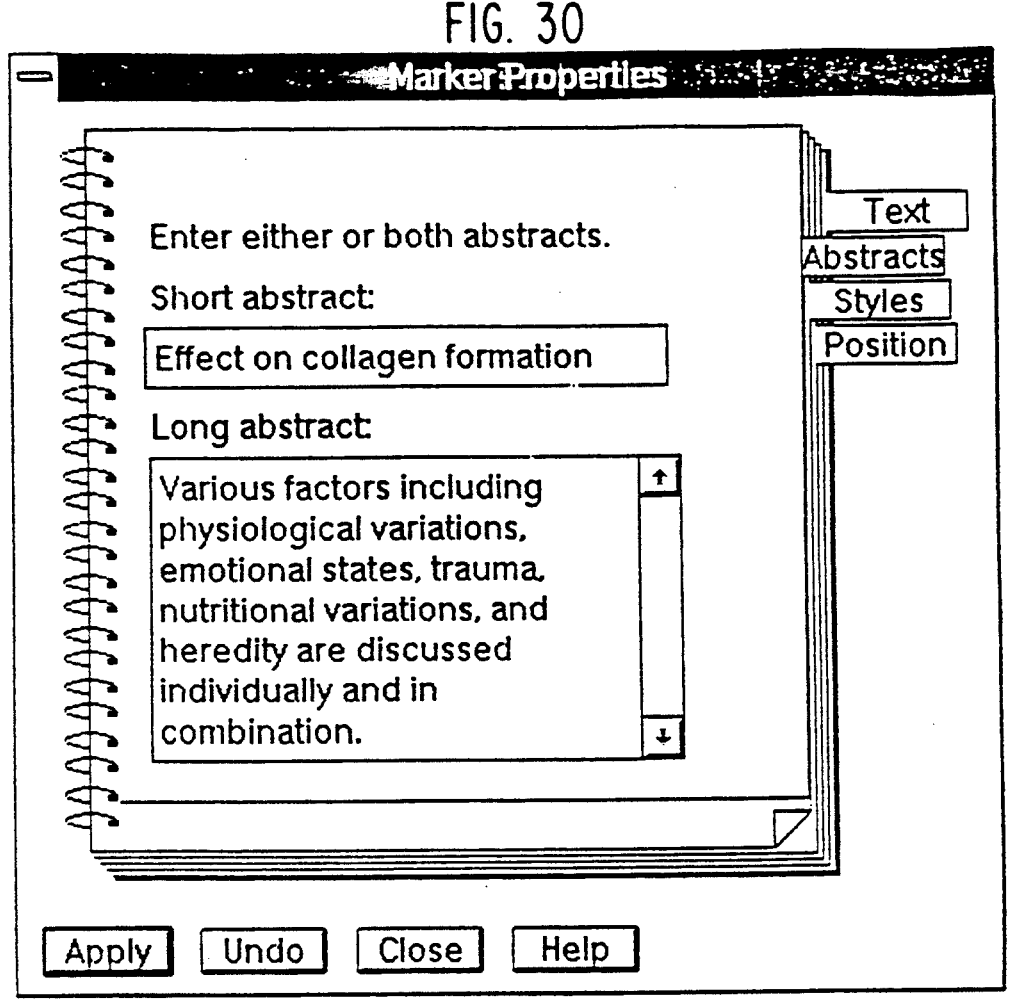
FIG. 30 is an example of an LMS abstract authoring dialog box.
Figure 31:
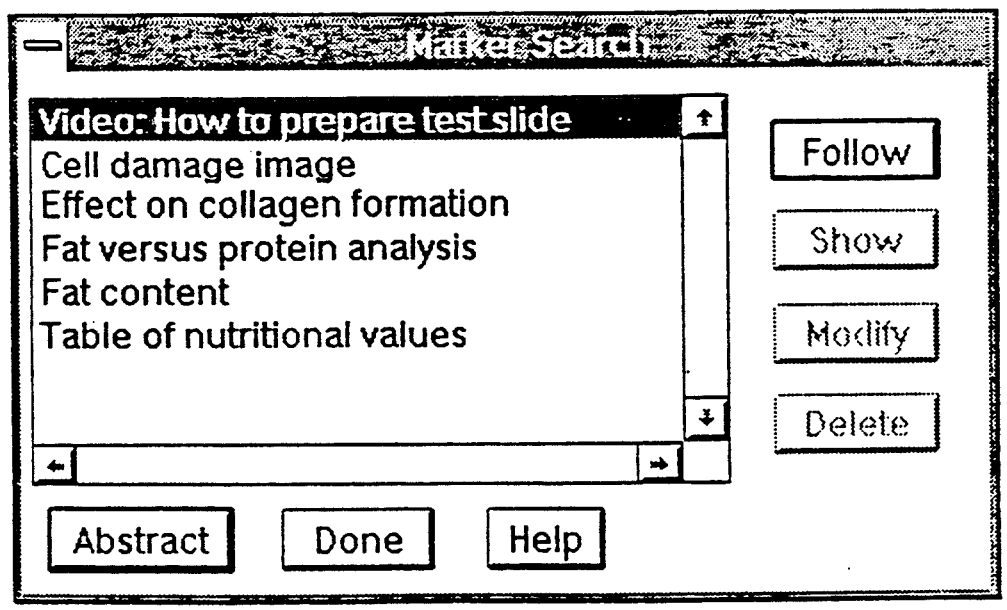
FIG. 31 is an example of an LMS abstract search results dialog box.

FIG. 30 shows an example of an LMS authoring dialog box. This is the user interface by which the summary text data which constitutes the abstract for a link marker is entered into the LMS hypermedia database. FIG. 25 shows an example of an LMS abstract search request dialog box which is used to prompt a user to input search criteria for searching the LMS hypermedia database. Note that in addition to entering search text, the user is also prompted to optionally select search parameters. FIG. 31 shows an example of an LMS abstract search results dialog box. This dialog box provides the user with a list of matches from the LMS hypermedia database where the search criteria was found. The user has the option in this dialog box to select one of the items displayed in the dialog box and, among other things, display the link marker abstract for that item, follow the link, and so on as indicated.

Figure 32A:
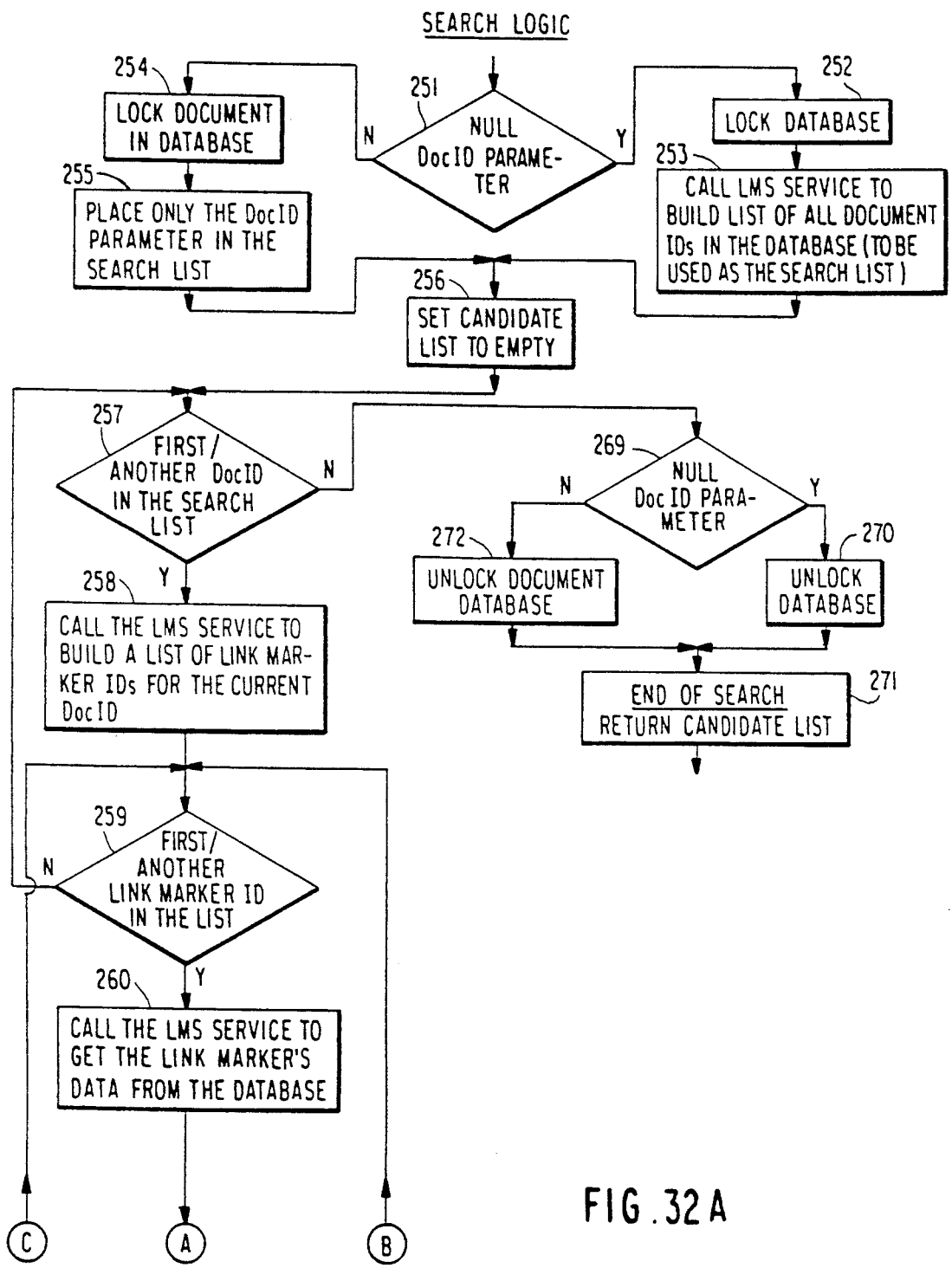
FIGS. 32A and 32B are a flow diagram showing the search logic according to the invention.
Figure 32B:
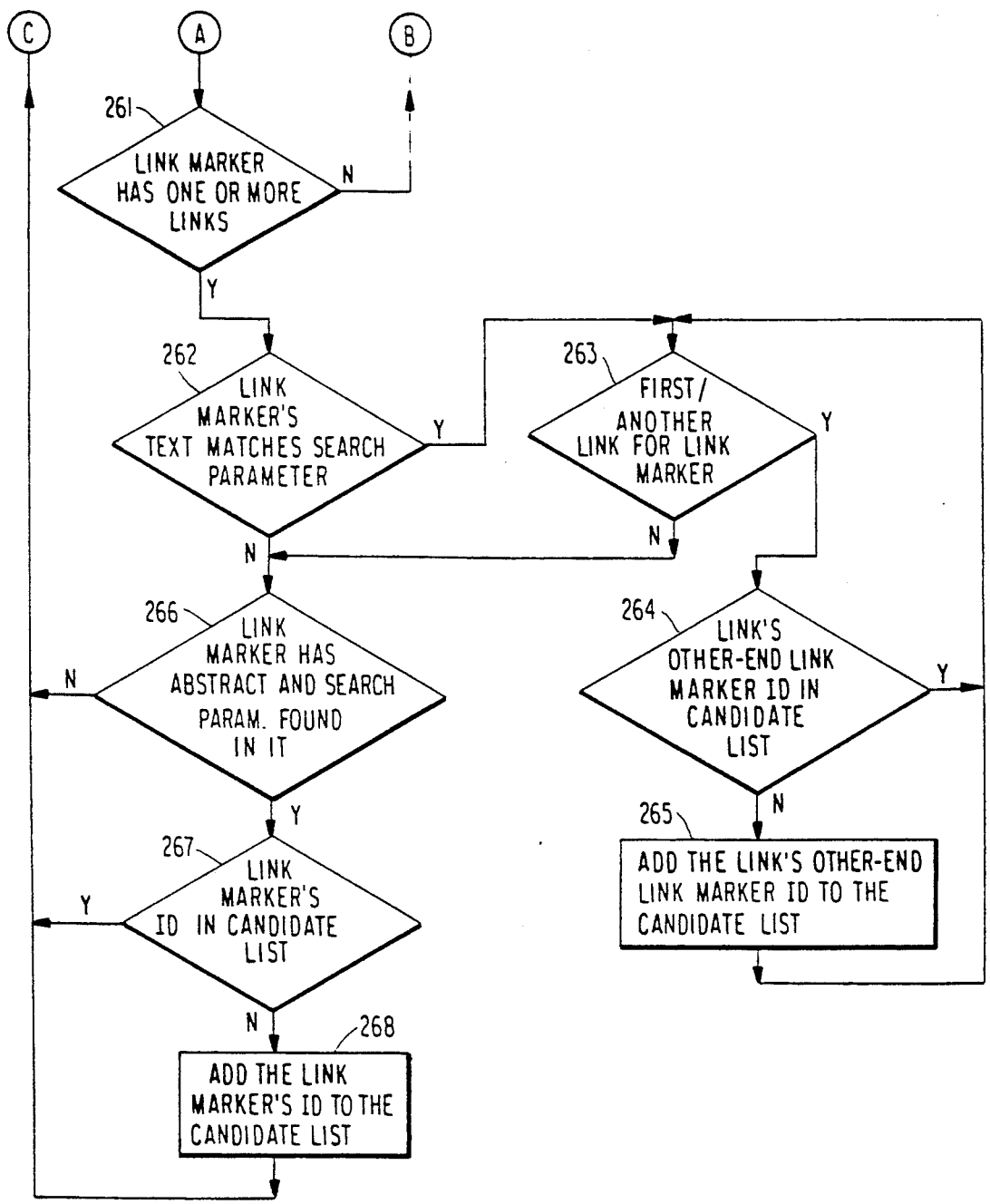

The logic for how the hypermedia LMS database is searched is illustrated in the flow diagram of FIG. 32, to which reference is now made. The process begins in decision block 251 where a test is made to determine if the document identifier search parameter is null. If so, the LMS is invoked to lock the database in function block 252 and, in function block 253, the LMS builds a list of all document identifications in the database to be used a the search list. On the other hand, if the search parameter is not a null, the document is locked in the database in function block 254, as before, but, in function block 255, the LMS builds a search list consisting of only the document identifier.

Once the search list has been built by the LMS either in function block 253 or in function block 55, the process goes to function block 256 where the search is initialized by setting candidate list to empty. Then a test is made in decision block 257 to determine if this is the first document in the list or if, on a subsequent pass, there is another document in the list. Assuming for the moment, that this is either the first document or there is another document in the list, the LMS is called in function block 258 to build a list of all link marker identifications for the current document identification. Then, in decision block 259, a test is made to determine if this is the first or there is another link marker identification in the list. If not, the process loops back to decision block 257 to build a list of link marker identifications for the next document in the list; otherwise, the LMS is called in function block 260 to get the link marker's data from the database. A further test in decision block 261 determined if the current link marker has one or more links. If not, the process loops back to decision block 259 to retrieve the next link marker's data from the database; otherwise, a further test is made in decision block 262 to determine if the link marker's text matches the search parameter. If so, a test is made in decision block 263 to determine if this is the first link or if there is another link for the link marker. If so, a test is made in decision block 264 to determine if the link's other end link marker identification is in the candidate list. If so, the process loops back to decision block 263; otherwise, the link's other end link marker identification is added to the candidate list in function block 265 before the process loops back to decision block 263.

If the test in decision block 263 does not determine that this is the first or that there is another link for the link marker, then the process goes to decision block 266 where a test is made to determine if the link marker has an abstract and, if so, whether the search parameter is found in the abstract. Remember that it is optional for the end user to enter an abstract when a link marker is created. If the search parameter is found in an abstract for the link marker, a further test is made in decision block 267 to determine if the link marker's identification is in the candidate list. If so, the process loops back to decision block 259; otherwise, the link marker's identification is added to the candidate list in function block 268 before the process loops back to decision block 259. Of course, if the link marker has no abstract, the process loops back to decision block 259 directly from decision block 266.

In decision block 259, when it is determined that there are no other link marker identifications in the list, the process loops back to decision block 257, and now assuming that all documents and link markers in the search list have been examined, a further test is made in decision block 269 to determine if the search parameter is a null and, if so, the database is unlocked in function block 270 and the candidate list is returned in function block 271. If the search parameter is not a null, then the document is unlocked in the database in function block 272 and the candidate list is returned in function block 271.

The search logic illustrated in the flow diagram of FIG. 32 is implemented in the pseudocode below, from which source code can be written in any suitable computer language. Preferably, the computer language should be an object-oriented language, and in one implementation of the invention, the C++ computer language was used. In the pseudocode, when the term compare is used in the logic description it is meant to include awareness of the above parameter rules concerning alignment and case insensitivity,.

```
SEARCH LOGIC
-If the document identifier search parameter is null
   -then invoke the LMS service for locking the
   database (prevent any modifications to the
   database by other processes);
   -else invoke the LMS service for locking the
   document specified by the document identifier
   search parameter in the database (prevent any
   modifications to the document in the database
   by other processes).
ENDIF
-BUILD A LIST OF DOCMUENT IDENTIFIERS OF THE
DOCUMENTS TO BE SEARCHED . . .
   -If the document identifier search parameter is
   null
      -then invoke the LMS service for building a
      list of all document identifiers in the
      database;
      -else place only the document identifier
      search parameter in the list of documents
      to be searched.
   ENDIF
ENDBUILD
-BUILD A LIST OF CANDIDATE TARGET LINK MARKER IDENTIFIERS . . .
   -Set the candidate list to being empty.
   FOR EACH DOCUENT IDENTIFIER IN THE LIST . . .
      -Invoke the LMS service for building a list of
      all link marker identifiers for the
      current document identifier.
      -FOR EACH LINK MARKER IDENTIFIER IN THE
      LIST . . .
         -Invoke the LMS service for retrieving link
         marker data from the database.
         -If the link marker has one or more links
```

```
                    SEARCH LOGIC
  emanating from it then . . .
     -If the link marker contains text and
      the text compares equal to the search
      parameter text then . . .
        -FOR EACH LINK EMANATING FROM THE
         CURRENT LINK MARKER . . .
            -If the link's other end link
             marker identifier is not in the
             candidate list then
               -Add the other end link marker
                identifier to the candidate
                list.
            ENDIF
         ENDFORLOOP
      ENDIF
     -If the link marker contains has an
      abstract, and the search parameter
      text compares equal to
      either the short or long abstract
      text, and the link marker identifier
      is not in the candidate list then
        -Add the link marker identifier to
         the candidate list.
      ENDIF
    ENDIF
  ENDFORLOOP
ENDFORLOOP
ENDBUILD (The list of qualifying candidate link
marker identifiers is now built.)
-If the document identifier search parameter is null
  -then invoke the LMS service for unlocking the
   database (permit modifications to the database
   by other processes);
  -else invoke the LMS service for unlocking the
   document specified by the document identifier
   search parameter in the database (permit
   modifications to the document in the database
   by other processes).
ENDIF
END aw SEARCH LOGIC
```

Trivial and obvious logic, concerning things such as checking for errors, etc., has been intentionally left out since it is not only obvious, but would also unnecessarily obscure the essence of the search logic for the reader.

Figure 33:
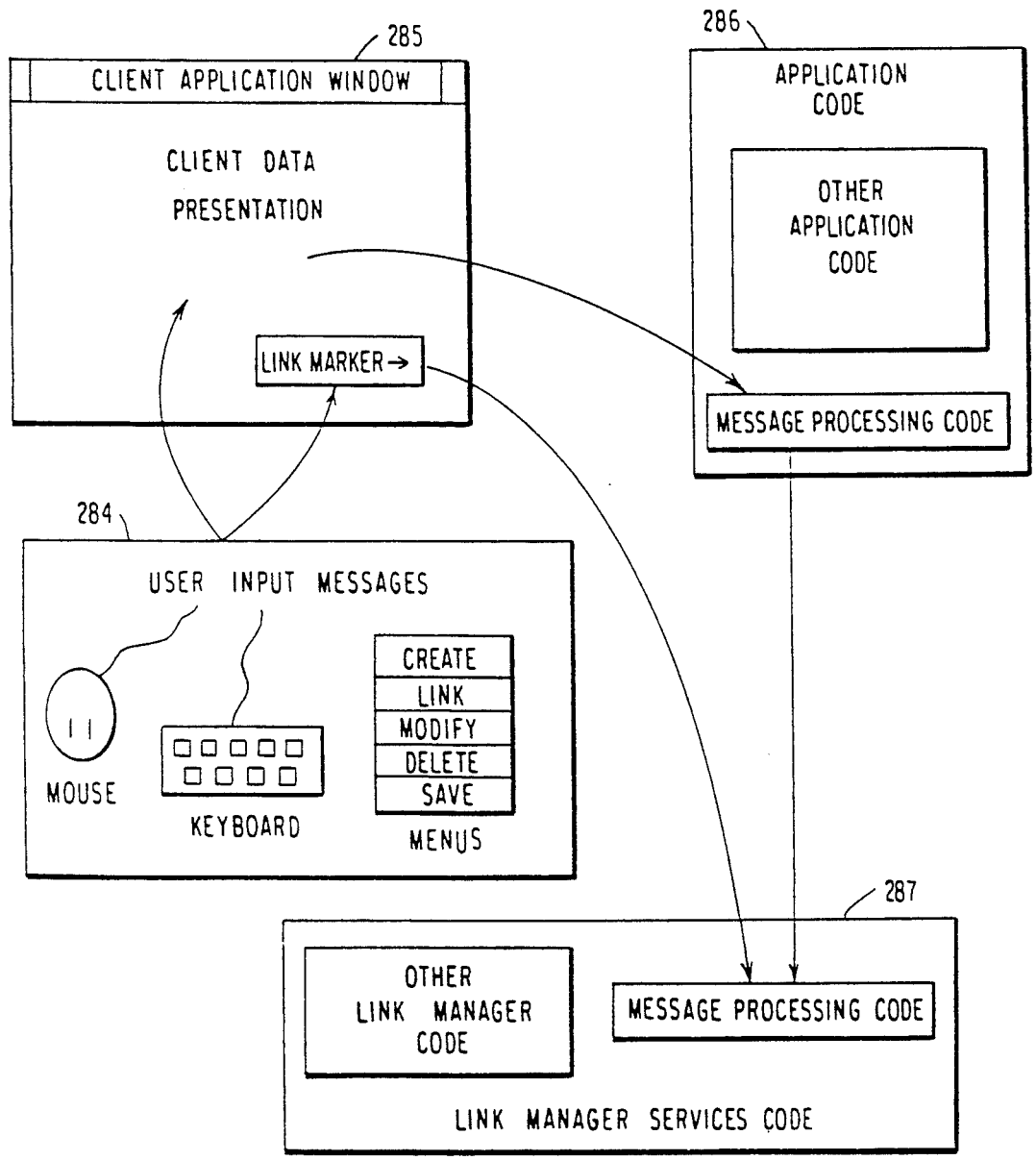
FIG. 33 is a block diagram showing the functional relationships between LMS, an application and the EUI.

LMS provides a consistent end user interface across all client applications for hypermedia menus, dialog boxes, mouse processing, and link marker display management. These facilities not only provide for the appearance of these notions, but also result in the execution of code to semantically satisfy the end user's request. The functional relationship between LMS and an application and the EUI is illustrated, by way of summary, in FIG. 33. The user may input commands, i.e., messages, in a variety of ways, as indicated by block 284. These include a mouse, keyboard or LMS menus. The messages may first of all be input to an application program via an application window 285. These messages are passed to the message processing code of the application 286 and, if the application chooses not to process the message, it is then sent to the message processing code of the LMS 287. An example is the generation of menus, both pull-down and context. On the other hand, the messages may be LMS messages, in which case the message is passed directly to the LMS 287. An example is when a link marker is selected.

Link marker abstracts are owned by their respective link markers. The creation or modification of link marker abstracts is managed entirely by LMS. Both the creation and modification may be accomplished either via the LMS EUI and/or the LMS API. The created/modified data will be stored into the LMS hypermedia database automatically whenever the rest of the data for the document, in which the link marker abstract's link marker resides, is saved. A link marker abstract will be automatically deleted from the LMS hypermedia database whenever the link marker that owns it is deleted from the database.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of providing hypermedia link marker abstract and search services in an open hypermedia system in which data for individual applications may be displayed on a screen of a display device in an application window, each of said windows including a main application workspace in which said data is displayed, said hypermedia system providing a uniform and consistent graphical user interface for applications which utilize hypermedia services available from said open hypermedia system, said method comprising the steps of:
   providing an open hypermedia system which allows any application to participate in linking, allowing a seamless integration of applications and application-rendered data developed totally independently from one another;
   prompting a user to input information to create a link marker within an application window, said link marker being bidirectionally linked to one or more other link markers and/or unidirectionally linked to objects not written for said open hypermedia system;
   providing the user with an option to input a link marker abstract in the form of summary text associated with the link marker; and
   maintaining a database of said link markers and link marker abstracts.

2. The method recited in claim 1 wherein said link markers contain text indicating information located at other ends of the link marker's links.

3. The method recited in claim 2 further comprising the steps of:
   displaying a dialog box on said display device for inputting data to be searched;
   searching said database link markers and abstracts in response to data input by a user; and
   displaying a list representing link markers in said database of data matching said input data.

4. The method recited in claim 3 wherein said data input by a user is text which may be a keyword, phrase or sentence.

5. The method recited in claim 3 further comprising the steps of:
   accepting a user input selecting a location in said list; and
   navigating to data in said database corresponding to a selected location in said list.

6. The method recited in claim 5 wherein if said data in said database corresponding to a selected location in said list is data of a second application, further comprising the step of displaying said data within an application window of said second application.

7. The method recited in claim 6 wherein if said second application is not currently running, further comprising the steps of:
   launching said second application; and
   opening an application window on said screen for said second application.

8. A system providing hypermedia link marker abstract and search services comprising:
   an open hypermedia system which allows any application to participate in linking, allowing a seamless integration of applications and application-rendered data developed totally independently from one another, said open hypermedia system displaying data for individual applications on a screen of a display device in an application window, each of said windows including a main application workspace in which said data is displayed, said hypermedia system providing a uniform and consistent graphical user interface for applications which utilize hypermedia services available from said open hypermedia system;
   means for prompting a user to input information to create a link marker within an application window, said link marker being bidirectionally linked to one or more other link markers and/or unidirectionally linked to objects not written for said open hypermedia system;
   means for providing the user with an option to input a link marker abstract in the form of summary text associated with the link marker; and
   means for maintaining a database of link markers and link marker abstracts.

9. The hypermedia system recited in claim 8 wherein said link markers contain text indicating information located at an end of the link marker's links.

10. The hypermedia system recited in claim 9 further comprising:
    means for displaying a dialog box on the screen of said display device for inputting a user data to be searched;
    means for searching said database link markers and abstracts in response to data input by the user; and
    means for displaying on said screen a list representing link markers in said database of data matching said input data.

11. The hypermedia system recited in claim 10, wherein said data input by a user is text which may be a keyword, phrase or sentence.

12. The hypermedia system recited in claim 10 further comprising:
    means for accepting a user input selecting a location in said list; and
    means for navigating to data in said database corresponding to a selected location in said list.

13. The hypermedia system recited in claim 12 further comprising means for displaying said data in said database corresponding to a selected location in said list within an application window of a second application if said data of said second application.

14. The hypermedia system recited in claim 13 further comprising:
    means for launching said second application if said second application is not currently running; and
    means for opening an application window on said screen for said second application.

* * * * *